(12) United States Patent
Vorontsov et al.

(10) Patent No.: US 11,387,621 B2
(45) Date of Patent: Jul. 12, 2022

(54) METHODS AND DEVICES FOR LASER BEAM PARAMETERS SENSING AND CONTROL WITH FIBER-TIP INTEGRATED SYSTEMS

(71) Applicant: II-VI Delaware, Inc., Wilmington, DE (US)

(72) Inventors: Mikhail Vorontsov, Spring Valley, OH (US); Vladimir Ovchinnikov, Columbus, OH (US)

(73) Assignee: II-VI DELAWARE, INC., Wilmington, DE (US)

( * ) Notice: Subject to any disclaimer, the term of this patent is extended or adjusted under 35 U.S.C. 154(b) by 59 days.

(21) Appl. No.: 16/815,591

(22) Filed: Mar. 11, 2020

(65) Prior Publication Data

US 2020/0366048 A1    Nov. 19, 2020

Related U.S. Application Data

(63) Continuation of application No. 16/411,299, filed on May 14, 2019, now Pat. No. 10,630,043.

(51) Int. Cl.
| | | |
|---|---|---|
| *H01S 3/13* | (2006.01) | |
| *H01S 3/10* | (2006.01) | |
| *H01S 3/23* | (2006.01) | |
| *H01S 3/067* | (2006.01) | |

(52) U.S. Cl.
CPC ...... *H01S 3/10061* (2013.01); *H01S 3/06712* (2013.01); *H01S 3/1304* (2013.01); *H01S 3/1305* (2013.01); *H01S 3/1307* (2013.01); *H01S 3/1308* (2013.01); *H01S 3/2308* (2013.01); *H01S 3/2383* (2013.01)

(58) Field of Classification Search
CPC .... H01S 3/1304; H01S 3/1305; H01S 3/1307; H01S 3/1308; H01S 3/2385
See application file for complete search history.

(56) References Cited

U.S. PATENT DOCUMENTS

2010/0260216 A1* 10/2010 Tamaoki ................. H01S 3/067
372/25
2011/0091155 A1* 4/2011 Yilmaz ............... H01S 3/10015
385/30

* cited by examiner

*Primary Examiner* — Michael Carter
(74) *Attorney, Agent, or Firm* — Blank Rome LLP

(57) ABSTRACT

A sensing method for in-situ non-perturbing measurement of characteristics of laser beams at the exit of the laser beam delivery fiber tips include measuring power of a laser beam transmitted through delivery fiber tip in fiber-optics systems. A sensing devices for in-situ non-perturbing sensing and control of multiple characteristics of laser light transmitted through light delivery fiber tips includes a fiber-tip coupler comprised of a shell with enclosed delivery fiber having a specially designed angle-cleaved endcap and one or several tap fibers that are specially arranged and assembled at back side of the endcap and other variations. Methods and system architectures for in-situ non-perturbing control of characteristics of laser beams at the exit of the laser beam delivery fiber tips include fiber-tip couplers and sensing modules that receive laser light from tap fibers, and systems for optical processing to enhance light characteristics suitable for in-situ measurement.

17 Claims, 14 Drawing Sheets

METHODS AND DEVICES FOR LASER BEAM PARAMETERS SENSING AND CONTROL WITH FIBER-TIP INTEGRATED SYSTEMS

PRIORITY

This application is a continuation of U.S. patent application Ser. No. 16/411,299, filed May 14, 2019, titled "Methods and Devices for Laser Beam Parameters Sensing and Control with Fiber-Tip Integrated Systems," the disclosure of which is incorporated by reference in its entirety.

FIELD

The disclosed technology pertains to sensing systems for in-situ non-perturbing measurement and control of characteristics of laser beams.

BACKGROUND

Glass fibers and fiber-optics devices may be used to route, distribute, and deliver laser beams from single or multiple laser sources to different destinations, including devices, machines, and systems that are located a distance from the laser source. The fiber-based devices are also widely utilized for intentional manipulation of laser beam characteristics inside the fiber (e.g. laser light power, polarization, phase). Laser beams propagate in fibers and fiber-optics systems over certain distances prior to being transmitted into air or other media through a tip of the fiber end-section, which may be referred to herein as the delivery fiber. The optical fiber itself may have a core and cladding areas having slightly different refractive index based on the material of their construction. Both the fiber core and cladding may provide guiding of laser light components known as modes, or guided transversal modes. The fibers that preserve propagation of a single-mode (SM) laser beam may be referred to herein as SM fibers. The SM fibers can be made to also maintain, substantially unchanged, the polarization state of the propagating in fiber light. These fibers are referred to as polarization maintaining (PM) SM fibers. In the so-called multi-mode fibers, the fiber core is larger compared to the SM fibers ranging from tens to hundreds of microns. These fibers may be known as large mode area (LMA) fibers and the multimode fibers guide either a few (few-mode fibers) or a number of transversal modes that comprise laser light inside the fiber and immediately after exiting the delivery fiber tip. The multimode fibers allow for much easier launching of light inside the fiber and can provide guiding of laser beams with significantly higher power (up to and above 10 kilowatts) if compared with the SM fibers. At the same time SM and LMA fibers provide better quality laser beam (e.g., a single-mode Gaussian shape beam) that has smaller divergence after exiting the fiber delivery fiber tip, which may be advantageous and highly desired for many applications.

Factors such as imperfections in fiber manufacturing, different operations with fibers (e.g., splicing of different fibers, fiber modification for stripping of high-order modes to maintain SM operation of a fiber system, tapering of fibers), environmental effects such as vibrations and temperature fluctuations, mechanical factors (e.g., fiber twisting and or bending), acoustical disturbances, and other factors may cause deviations in characteristics of the laser light that is transmitted from the delivery fiber tip. Examples of deviations from the expected or desired laser beam characteristics may include, for example: (a) temporal fluctuations of the transmitted laser power, polarization state, piston phase that is associated with deviations in optical path length in fiber systems; (b) appearance of undesired laser irradiance components such as high-order modes, light components coming through the fiber cladding (e.g., cladding light), laser light used as a pump in fiber amplifiers and fiber lasers (e.g., residual pump light); (c) changes in the transmitted light characteristics that are associated with non-linear effects in fibers such as the stimulated Brillion scattering (SBS) and non-linear phase modulation; (d) changes in the transmitted light that are related with external light that is received through the fiber tip (e.g. back reflected light).

It may be advantageous for such deviations from the expected or desired transmitted light characteristics to be detected in situ.

BRIEF DESCRIPTION OF THE DRAWINGS

The drawings and detailed description that follow are intended to be merely illustrative and are not intended to limit the scope of the invention as contemplated by the inventor.

DETAILED DESCRIPTION

The inventors have conceived of novel technology that, for the purpose of illustration, is disclosed herein as applied in the context of non-perturbing (e.g., mitigating or minimizing any negative effects of) sensing of the characteristics of laser light that is transmitted off the tip of delivery fiber in fiber-optics systems and utilization of the disclosed sensing methods and devices for laser beam characteristics control in fiber-optics systems. While the disclosed applications of the inventor's technology satisfy a long-felt but unmet need in the art of fiber-optics systems, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Sensing of the laser light characteristics at the delivery fiber tip exit may be advantageous for several reasons including but not limited: (a) quality evaluation of the transmitted laser light; (b) prevention of catastrophic events leading to fiber system partial or even fatal damage, such as fiber tip contamination, growth of non-linear effects above acceptable threshold, appearance of back reflected light of unacceptably high power level; (c) active or adaptive control of the laser beam characteristics to either mitigate the undesired deviations in laser beam characteristics (e.g. stabilize the transmitted power, eliminate high-order modes, decrease phase noise, nonlinear effects), or to set one or several laser beam characteristic to a desired state, for example, to provide desired mutual stabilization (e.g., locking) of piston phases or polarization states in the master-oscillator power amplifier (MOPA) type multi-channel fiber and fiber array systems.

It may also be advantageous to provide a sensing system used for in-situ detection of the transmitted through fiber tip light that is undisruptive and doesn't perturb characteristics of this light. Implementations of the disclosed herein advanced methods and devices for in-situ non-perturbing sensing of multiple characteristics of laser light transmitted through light delivery fiber tip will create new opportunities for a wide range of fiber optics technologies especially in the areas of high power fiber systems for material processing, defense and aerospace applications.

Figure 1A:
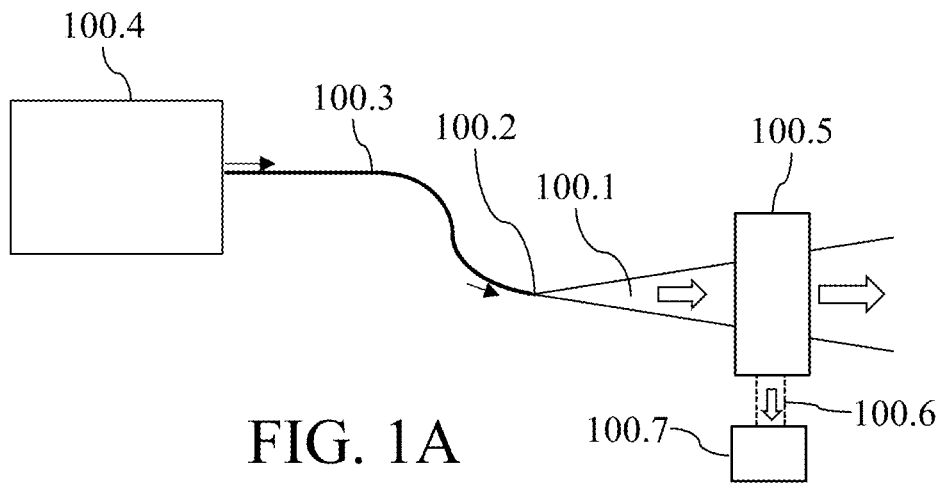
FIG. 1A is a schematic illustration of an exemplary approach for laser beam sensing using external light tapping that utilizes an external beam sensing optical system.
Figure 1B:
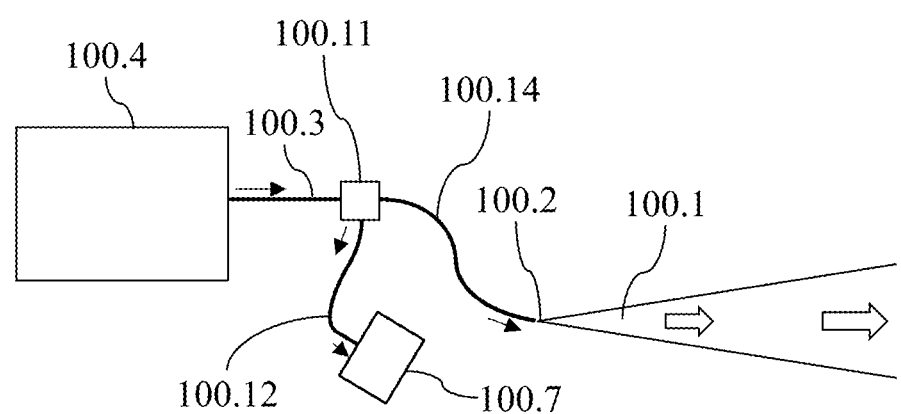
FIG. 1B is a schematic illustration of an exemplary approach for laser beam sensing using fiber-based light tapping based on fiber-integrated beam splitter and/or fiber tap coupler.

Conventionally, sensing of the laser beam characteristics in fiber-optics systems may be performed using approaches such as those illustrated in FIGS. 1A and 1B. The approach shown in FIG. 1A, referred to as external light tapping, is based on splitting or tapping optical power of a laser beam (100.1) that is transmitted through a fiber tip (100.2) of the delivery fiber (100.3), from the fiber-optics system (100.4), using an external beam sensing (EBS) system (100.5) that may include beam splitters, mirrors, diffractive gratings etc, which is located inside the transmitted through fiber tip beam (100.1) and used to send a portion of the light (100.6) to a sensing module (100.7).

In the approach to laser beam characteristic sensing in FIG. 1B, referred to as fiber-based light tapping, that approach is based on utilization of a fiber-integrated beam splitter (100.11), commonly referred to as a fiber tap coupler, that diverts a portion of laser beam propagating in the delivery fiber (100.3) to the tap fiber (100.12) that routes it to the sensing module (100.7).

Figure 2A:
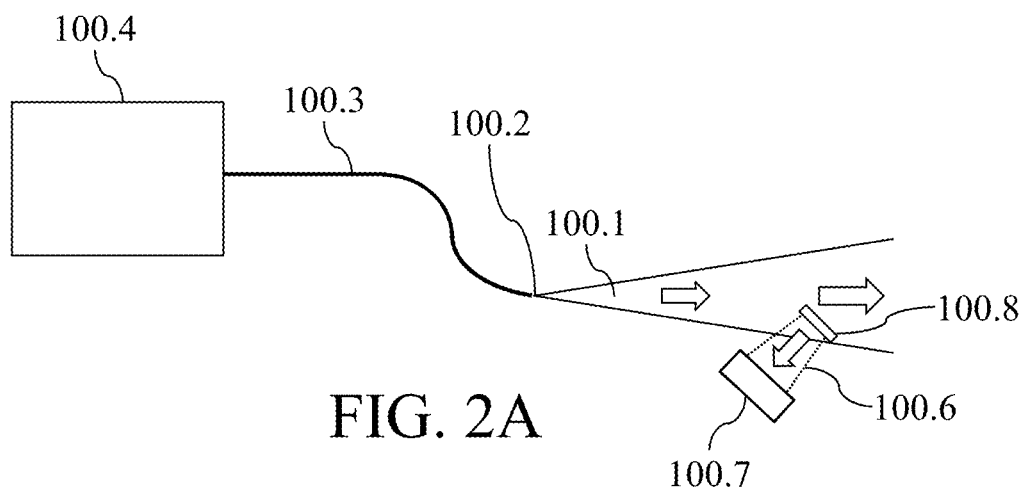
FIG. 2A is a schematic illustration of external beam sensing using a small tap mirror placed in the beam path.
Figure 2B:
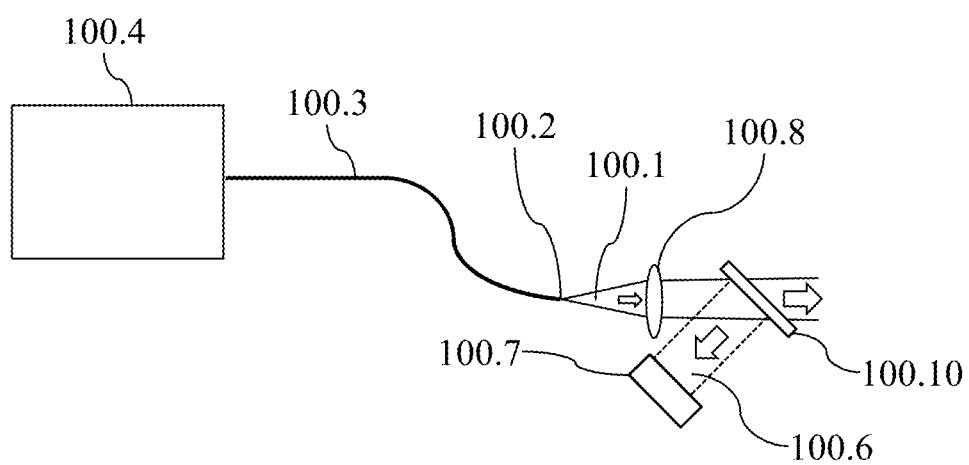
FIG. 2B is a schematic illustration of external beam sensing utilizing a beam splitter to redirect a small portion of the transmitted beam into a sensor.

Two examples of possible EBS systems (100.5) are illustrated in FIGS. 2A and 2B. In the first example, the external beam sensing system is composed a small mirror (100.8) that is located inside the transmitted beam (100.1) and redirects portions of this beam on to the sensing module (100.7). The second example of EBS system in FIG. 2B. includes the lens (100.9) that collimate the transmitted light and a beam splitter (100.10) that redirect a portion of the transmitted light (100.6) to the sensing module (100.7).

The sensing techniques illustrated in FIGS. 1A and 1B have several major drawbacks. The external light tapping requires installation and alignment of additional optical elements inside the transmitted beam, which may be difficult or even impossible to implement in practice (e.g. due to constrains on available space, or overall optical system weight). Additionally, these optical elements may noticeably affect (e.g., perturb or change) laser beam characteristics such as power, intensity, phase profiles, polarization state, and other characteristics (e.g., by introducing beam obscuration, absorption, optical aberrations). In the case of high-power fiber laser systems, the external light tapping may be especially difficult to implement, as the optical elements in the path of the high-power beam should withstand thermal deformations without perturbing laser beam characteristics.

On the other hand, the fiber-based light tapping using fiber-integrated couplers could provide monitoring of laser light characteristics at the location of the fiber tap coupler as illustrated in FIGS. 1A and 1B. In this case, the section of the delivery fiber (100.14) located between the fiber tap coupler (100.11) and the delivery fiber tip (100.2) may introduce additional changes into the transmitted laser beam characteristics which cannot be detected with the fiber tap coupler. Additionally, the existing fiber tap couplers generally only operate at relatively low (e.g., on the order of tens-to-hundreds of Watts) laser power and may be inappropriate for monitoring and sensing of laser beam characteristics in kW-class fiber-optics systems. The power limitation of the current technology is related to inefficient coupling of the high power (HP) laser beam to the tap fiber, resulting in generation of unacceptably high level of heat. From the analysis above, it follows that development of sensing methods and corresponding devices for in-situ measurement and control of characteristics of laser beam at the delivery fiber tip, which are non-perturbing, undisruptive, and capable of withstanding kW laser power levels, cannot apparently be based entirely on the existing technology, and may require different approaches. The drawbacks of the current technology can be completely or partially alleviated with varying implementations of the systems and methods disclosed herein, which offer desired solutions to the problems discussed above as well as other problems present, whether recognized or not, in conventional systems.

In particular, implementations of the technology disclosed herein may provide a sensing and control system having low insertion loss, that does not affect parameters of the transmitted beam, and that may be applicable for the use with different fiber types including large mode area (LMA), double-clad fibers, polarization maintaining (PM) and non-PM fibers, and photonic crystal and photonic bandgap fibers. Some or all of these objectives could be fulfilled with varying implementations and combinations of the fiber tip coupling method and devices disclosed herein.

Fiber Tip Couplers for Laser Light Sensing

The disclosed methods and systems may be implemented for in-situ sensing and control of the laser light transmitted through a delivery fiber tip in fiber-optics systems, which may be referred to as fiber-tip-coupler (FTC) sensing methods and systems. An example of an FTC system (200) is illustrated in FIG. 3, and a more detailed view is illustrated in FIG. 4.

Figure 3:
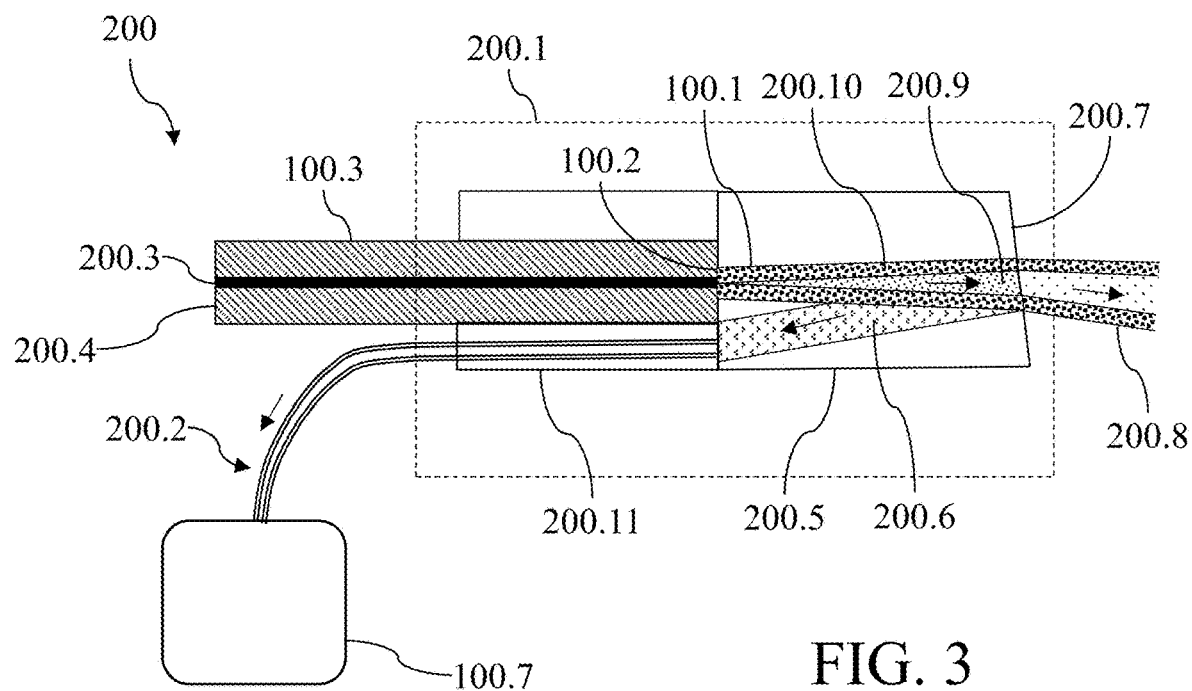
FIG. 3 is an illustration of a fiber-tip coupler for in-situ sensing of the laser light transmitted through a delivery fiber tip, using a notional schematic of the fiber-tip coupler cross section along the optical axis.

The FTC system (200) in FIG. 3 is composed of the FTC glass assembly (200.1), with one or several tap fibers (200.2) and sensing module(s) (100.7). The FTC system may be self-contained within a single unit, module, or device, or may be spread across one or more units, modules, or devices. The FTC glass assembly (200.1) in FIG. 3 and FIG. 4 shows the distal portion (e.g., the last few centimeters) of the delivery fiber (100.3) with the core (200.3) and cladding (200.4). FIG. 3 illustrates the cross section of the FTC assembly along the optical axis, while FIG. 4 shows the FTC cross section at the delivery fiber tip plane (100.2). The delivery fiber (100.3) may be coming from a fiber-amplifier, fiber laser or other fiber-optics system type, and may have a diameter around 400 microns, as in many high-power fiber systems, or any other diameter of commonly used fibers. The delivery fiber (100.3) has attached (e.g. fused) to it an endcap (200.5). The endcap (200.5) has a few mm length and diameter $d_{e-c}$ that may be equal or larger than the delivery fiber diameter $d_{d-f}$. The endcap (200.5) in FIG. 3 is cleaved at a relatively small (~4-8 deg.) angle, and could be anti-reflection (AR) coated. Even with the AR coating, a small (<0.1%) fraction of the light (100.1) transmitted through the fiber tip (100.2), referred to as back reflected light (200.6), is reflected off the glass-air interface (200.7) and propagates back inside the endcap (200.5).

The light (200.8) that is transmitted through the endcap (200.5) exits the FTC fiber assembly (200.1). The light (100.1) transmitted through the fiber tip (100.2), as well as the back reflected light (200.6), and correspondingly the transmitted light (200.8) exiting through the endcap (200.5), originate from a laser beam coming from the delivery fiber core (200.3), also referred to as a main beam (200.9). The light components that enter the endcap (200.5) through the delivery fiber cladding (200.4) may be referred to as cladding light (200.10). Note that the cladding light (200.10) has larger divergence compared with the main beam (200.9) and may also include residual pump light.

Figure 4:
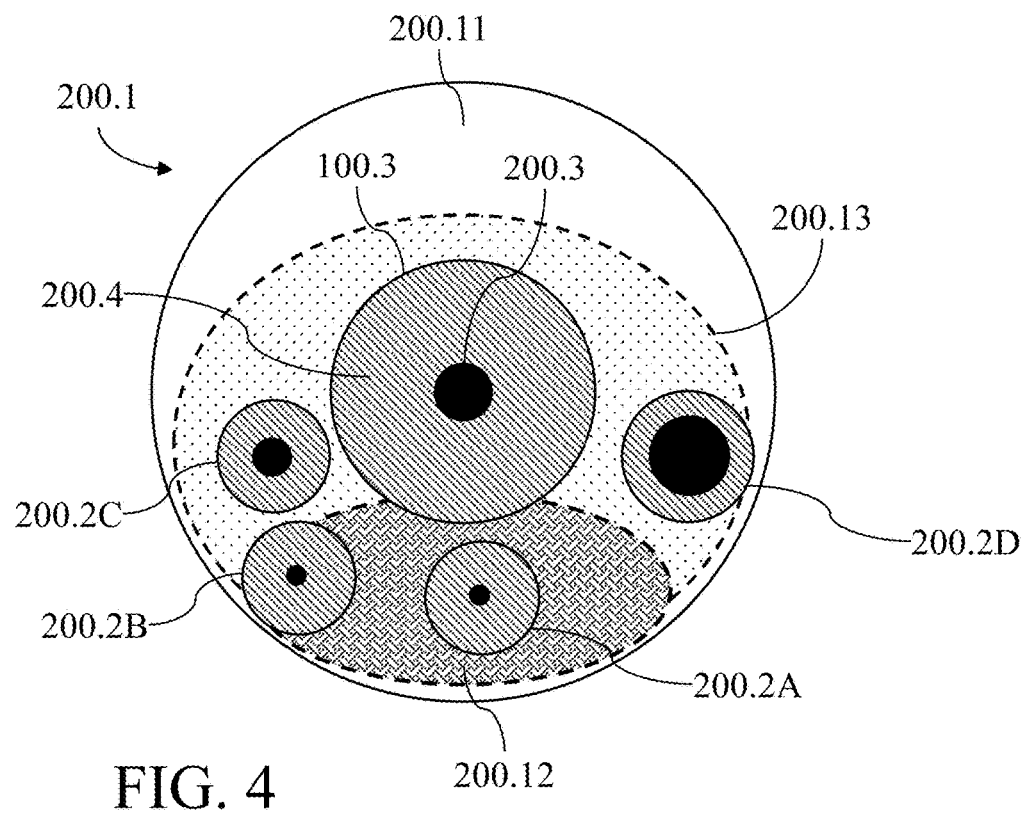
FIG. 4 is a notional schematic of a cross section along the delivery fiber tip of FIG. 3.

The operation principle of the FTC assembly (200.1) in FIG. 3 and FIG. 4 is based on utilization the back reflected light (200.6) for sensing one of several characteristics of the transmitted light (200.8). These characteristics may include laser power, polarization and differential phase, also referred to as piston phase, of the main beam (200.9), power of the cladding light (200.10), and presence and contribution of high-order modes coming from either the fiber core or cladding. These sensing functions of the FTC assembly (200.1) are achieved using a specially designed angle-cleaved endcap (200.5). The light (200.6) that is reflected from the glass-air interface (200.7) of the endcap (200.5), propagates back inside the endcap (200.5) to the plane of the delivery fiber tip (100.2) where it is received by a single or several tap fibers (200.2). In FIG. 4 the tap fibers are shown as including four different fiber types (200.2A through 200.2D). Both the delivery fiber (100.3) and the surrounding tap fibers are assembled inside a special shell (200.11) that holds the tap fibers (200.2) and provides coupling of the back reflected light (200.6) into the tap fiber (200.2) tips.

The multi-tap FTC fiber assembly (200.1) in FIG. 4 is composed of four tap fibers (200.2A-200.2D). For illustration purpose only these tap fibers include: the SM PM tap fiber (200.2A), SM non-PM tap fiber (200.2B), LMA tap fiber (200.2C) and the multi-mode tap fiber (200.2D). These tap fibers (200.2A-200.2D) are attached (e.g. fused) to the back surface of the endcap (200.5) as shown in FIG. 3, in such a way that the back reflected light (200.9) received by one or many tap fibers (200.2) and delivered to the sensing module (100.7). Note that for in-situ sensing of the transmitted light polarization the tap fibers may be PM-type fibers that preserve the polarization state of the back reflected light (200.6).

Figure 5:
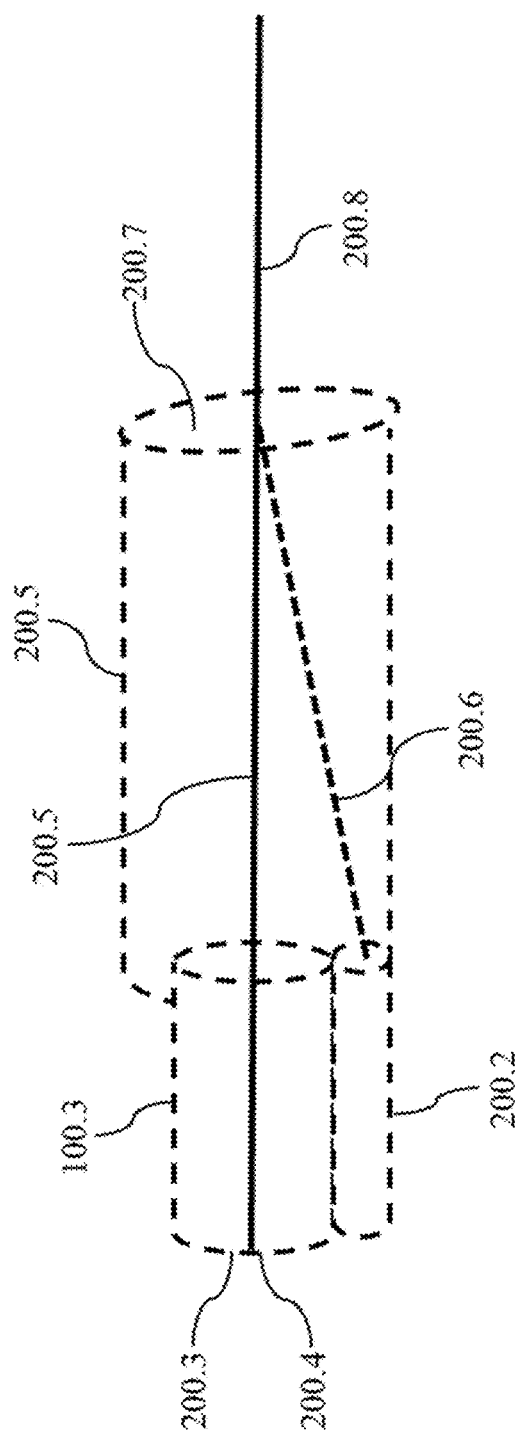
FIG. 5 is a schematic view of an exemplary ray tracing-based analysis of the fiber-tip coupler of FIG. 3.

To optimize coupling efficiency and separate the main beam (200.9) and cladding light (200.10) components of the back reflected light (200.6), the parameters of endcap (200.5) and location of tap fibers (200.2) inside the shell (200.11) may be properly selected through analysis using conventional ray tracing or wave-optics methods. It may be advantageous, for efficient sensing of the main beam characteristics, for the position of the tap fiber core to be close to or to coincide with the center of the back reflected main beam footprint (200.12), as illustrated in FIG. 4. The coordinates of the center depend on the transmitted beam wavelength and parameters of the fiber endcap (200.5), which may include, for example, endcap refractive index, length, and cleave angle, and may be estimated through ray tracing simulations. FIG. 5 provides an example of ray tracing simulations performed for the transmitted beam wavelength λ=1064 nm, delivery fiber with 19 μm core, silica endcap with diameter d=0.4 mm, length L=3 mm and cleave angle α=5 deg. In the ray tracing in FIG. 5, a SM tap fiber with 125 μm diameter and 7 μm core was used. Note that for optimal light coupling the tap fibers may be additionally angle-cleaved and tilted inside the glass shell (200.11).

In the case of delivery fibers that can provide a single-mode or a few-modes operation, such as SM and LMA fibers, the transmitted main beam (200.9) may have significantly low divergence compared with the divergence of the cladding light (200.10). Correspondingly, as illustrated in FIG. 4, the back reflection of main beam results in a footprint (200.12) at the plane of tap fiber tips (100.2) which is significantly smaller compared to the corresponding footprint (200.13) of the back reflected cladding light. This allows independent detection of low- and high-divergence components of the transmitted light (200.8), including low- and high-order modes, and cladding and residual pump light, by arranging the tap fibers in respect to the back reflected main beam footprint center (200.12).

For the purpose of illustration, the SM PM tap fiber (200.2A) in FIG. 4 is located at the center of the main beam footprint (200.12) and, hence, primarily couples single-mode component of the light transmitted through the core (200.3) of the delivery fiber (100.3), thus providing capabilities for in-situ monitoring of its characteristics (e.g. power, polarization and piston phase). The power level of the light is sensitive to the presence or appearance of different modes in the main beam (200.9), and may be effectively used for forecasting and prevention of "catastrophic" events in the fiber-optics systems which are commonly associated with abrupt laser power drop, such as fiber fusion.

The SM non-PM tap fiber (200.2B) in FIG. 4 is shown as being shifted in respect to the center of the back reflected main beam footprint (200.12). In this manner, tap fiber light may be used to detect appearance of higher-order modes in the transmitted main beam (200.9). These modes are commonly caused by several factors, including environmental factors such as bending of the delivery fiber, thermal and mechanical disturbances, as well as imperfections in fiber splicers, fiber connectors, defects in fibers and non-linear effects. The appearance and content of the high-order modes in the transmitted light may also be detected using the LMA tap fiber (200.2C) that may be further shifted off the center of the back reflected main beam footprint (200.12) for better separation of the high-order modes. The LMA tap fiber may have a larger core diameter compared with the SM fiber, which leads to an increase in the received light power and better signal-to-noise ratio (SNR) in high-order modes sensing. For both cladding and residual pump light sensing, the large-core-diameter multi-mode tap fibers located inside the cladding light footprint (200.13) may have advantages compared with SM and LMA tap fibers, as they provide better SNR. In FIG. 4 the multi-mode tap fiber (200.2D) is shown as being located outside the back reflected main beam footprint (200.12).

The tap fibers may be encased within a shell (200.11) of the FTC assembly (200.1) using different methods, which may prevent movement during placement and use and may provide protection to the fibers. In one implementation of the FTC shell (200.1), disclosed and referred to as a multi-hole glass ferrule (MH-GF), the tap fibers are secured inside a solid block of glass with through holes guiding the delivery (100.3) and surrounding tap fibers (200.2).

In FIG. 3 and FIG. 4, for the purpose of illustration only, the holding tap-fibers MH-GF shell (200.11) is shown as a solid glass cylindrical glass block (e.g., ferrule) with diameter similar or equal to the endcap (200.5) diameter. The glass ferrule has a set of holes (e.g., capillaries), one central hole for the delivery fiber (100.3), and periphery holes for the tap fibers. The glass ferrule with tap fibers is attached (e.g. fused) to the endcap (200.5).

Figure 6A:
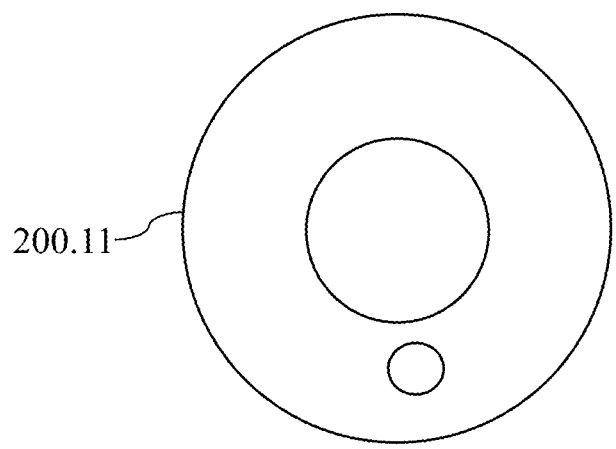
FIG. 6A is a front elevation view of an exemplary single-tap fiber-tip-coupler assembly based on multi-hole glass ferrule (MH-GF)
Figure 6B:
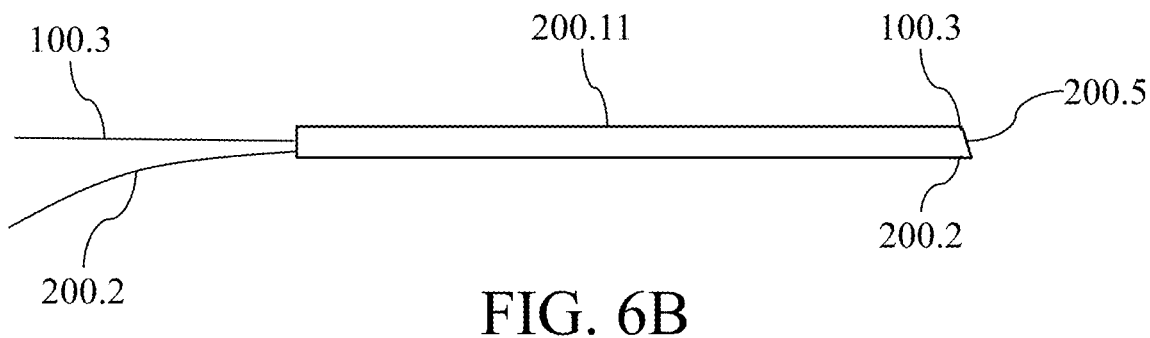
FIG. 6B is a side view of the single-tap fiber-tip-coupler assembly of FIG. 6A.
Figure 6C:
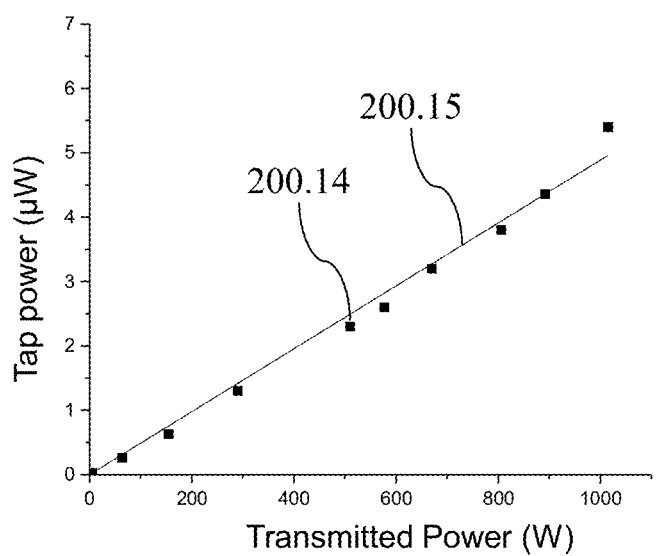
FIG. 6C is a graph showing an exemplary set of measured and approximated calibration data that may be utilized for the transmitted laser power sensing using the MH-GF device of FIG. 6B.

FIGS. 6A and 6B illustrate an example of the MH-GF fiber holder with two holes for holding a 400 µm SM delivery fiber with 19 µm core and a single 80 µm multi-mode tap fiber. FIG. 6A shows an exemplary MH-GF (200.11) of diameter 1.0 mm with a central hole for holding of a delivery fiber, and a smaller hole on the bottom for holding a tap fiber. FIG. 6B shows a single-tap FTC assembly based on the MH-GF in FIG. 6B. FIG. 6C shows the results of a single-tap FTC sensor calibration using the MH-GF of FIGS. 6A and 6B. While FIGS. 6A-6C show a specific example of a delivery fiber and its resulting performance, it should be understood that delivery fibers having other characteristics are usable with the systems and methods disclosed herein, with such variations being apparent to those of ordinary skill in the art in light of this disclosure. For example, note that FIGS. 6A-6B show a particular implementation of a MH-GF shell (200.1), and it will be apparent to those of ordinary skill in the art, in light of this disclosure, that an MH-GF shell having different characteristics could be made for a desired application. The measured calibration data (200.14) and the corresponding fitting line (200.15) in FIG. 6C show a correspondence of light power received through the tap fiber, and light power transmitted through the endcap as output laser power. For the FTC sensor calibration, the single-tap FTC assembly was fiber-spliced to a high-power fiber amplifier with the transmitted power ranging from 50 W to 1000 W, though it should be understood that other operational characteristics are possible and will be apparent to those of ordinary skill in the art in light of the disclosure herein.

The data represented by the calibration curve (200.15) in FIG. 6C can be used for in-situ sensing of the transmitted through the endcap laser power with the single-tap FTC sensor. The delivery fiber of FIG. 6A-6B had an AR coated 3 mm length endcap of diameter 400 µm with ~3.4 deg. cleave. After being assembled together the endcap and MH-GF fiber holder with the delivery fiber and a SM tap fiber were fused together producing the single-tap FTC optical power sensor.

In some implementations, the FTC assembly (200.1) may be made as an all-glass capillary-integrated multi-tap FTC sensing module (300) referred to as a CIMT sensing module. An exemplary CIMT sensing module disclosed herein is illustrated in FIG. 7, FIGS. 8A-8C and FIGS. 9A-9D.

Figure 7:
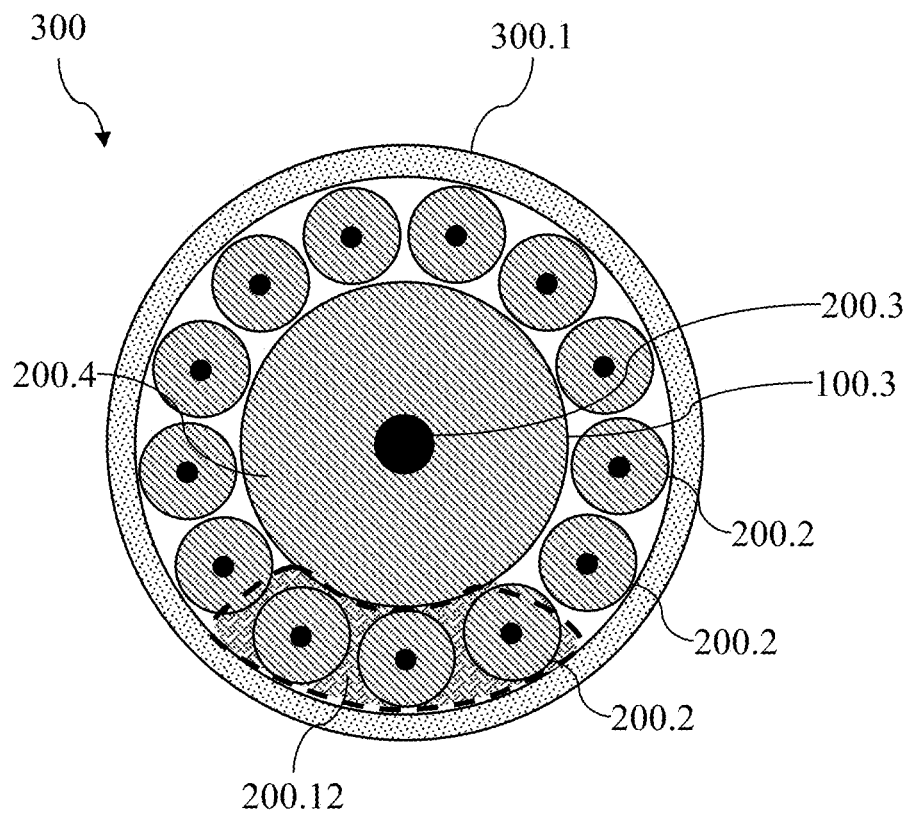
FIG. 7 is a notional schematic illustrating a concept of an all-glass capillary-integrated multi-tap (CIMT) fiber-tip-coupler sensing module showing the CIMT cross-section in the plane of tips of delivery and tap fibers.
Figure 8A:
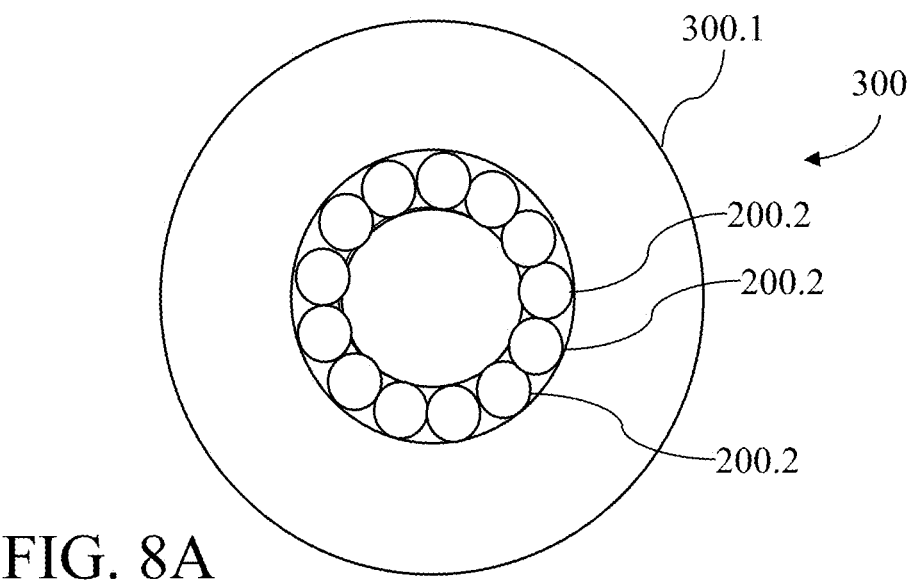
FIG. 8A is a front elevation view of an exemplary CIMT sensing device showing the CIMT cross-section in the plane of tips of delivery and tap fibers.
Figure 8B:
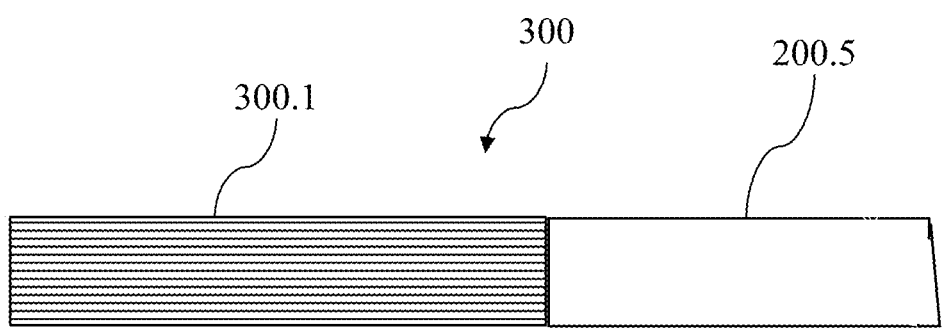
FIG. 8B is a side view of the CIMT of FIG. 8A showing an end cup section and capillary end-section displaying the delivery and tap fibers entering the capillary.
Figure 8C:
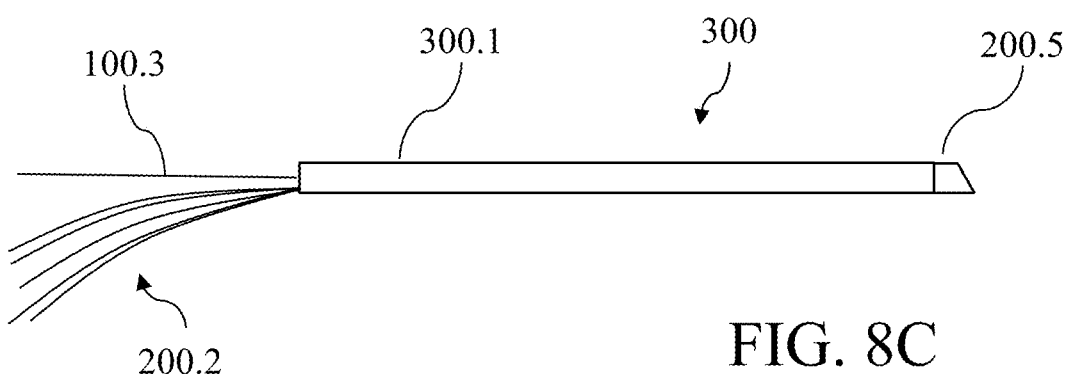
FIG. 8C is a side view of the CIMT sensing device of FIG. 8A and FIG. 8B.

The CIMT sensing module (300) in these figures is composed of a few cm-long glass capillary (300.1) with a bundle of N (specific for each delivery fiber diameter) densely packed tap fibers (200.2) surrounding the delivery fiber (100.3), as illustrated in FIG. 7. FIGS. 8A-8C illustrate the same, for the case of the delivery fiber with diameter $d_{d-f}$=400 µm and 13 tap fibers of diameter $d_{d-t}$=125 µm. In the CIMT sensing module (300) the tap fibers may have near identical diameter, but the tap fiber type may be different (e.g. may include different combinations of SM PM, SM non-PM, LAM and multi-mode fibers). In a possible CIMT sensing module (300) manufacturing method, the delivery fiber with a bundle of tap fibers is assembled inside a glass capillary, then collapsed into a solid glass block by heating with $CO_2$ laser or other means, then cleaved, and spliced to an angle-cleaved endcap thus forming a rigid all-glass module.

FIGS. 8A-8B, and the side view of FIG. 8C, illustrate an exemplary CIMT sensing module (300) made of glass capillary using 400 µm diameter delivery fiber and a bundle of 13 tap SM PM fibers of 125 µm diameter. FIGS. 8A-8C show a particular implementation of a CIMT sensing module (300), and it will be apparent to those of ordinary skill in the art, in light of this disclosure, that CIMT sensing modules having different characteristics and manufacturing method could be made. FIG. 8A shows the cross section of the collapsed into a solid glass block capillary with the tap fibers after cleaving, and FIG. 8B shows the microscopic view of the CIMT sensing module with the fused endcap of diameter 1.00 mm, 3.0 mm length and cleave angle 4.5 deg. In this exemplary CIMT sensing module (300), the endcap was used without AR coating.

Figure 9A:
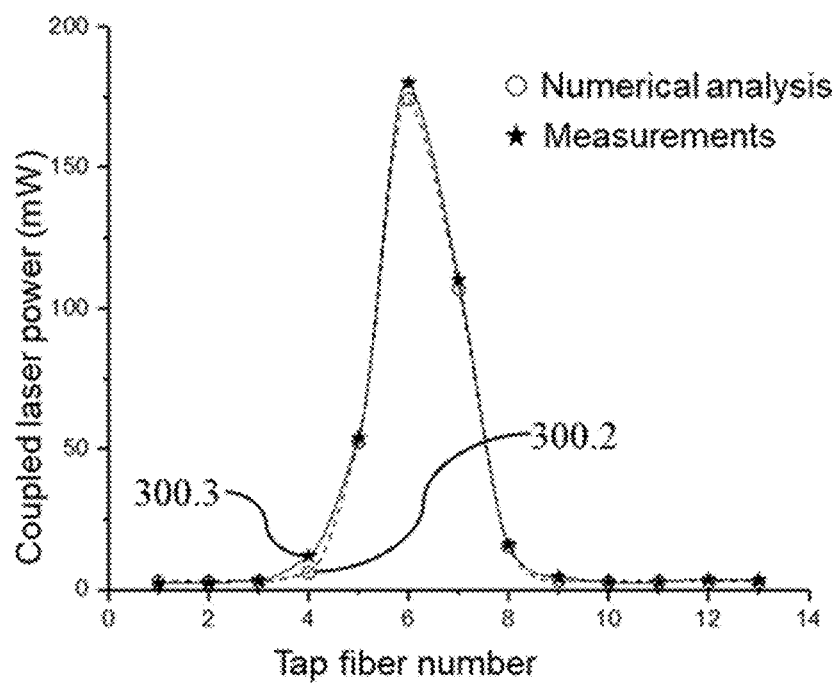
FIG. 9A shows a graph of exemplary calibration data of the CIMT device of FIG. 8A obtained using measurements and numerical simulations to be utilized for sensing of the main beam quality.
Figure 9B:
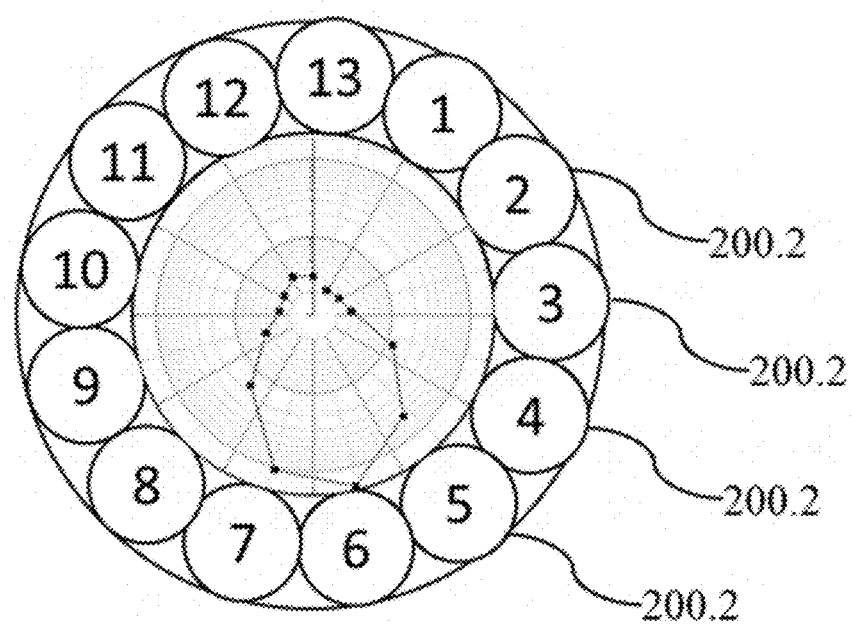
FIG. 9B shows the CIMT cross-section in the plane of tips of delivery and tap fibers with the distribution of the laser power received by the 13 tap fibers in the form of a polar plot that is superimposed with side elevation view of the tap fibers in FIG. 7.
Figure 9C:
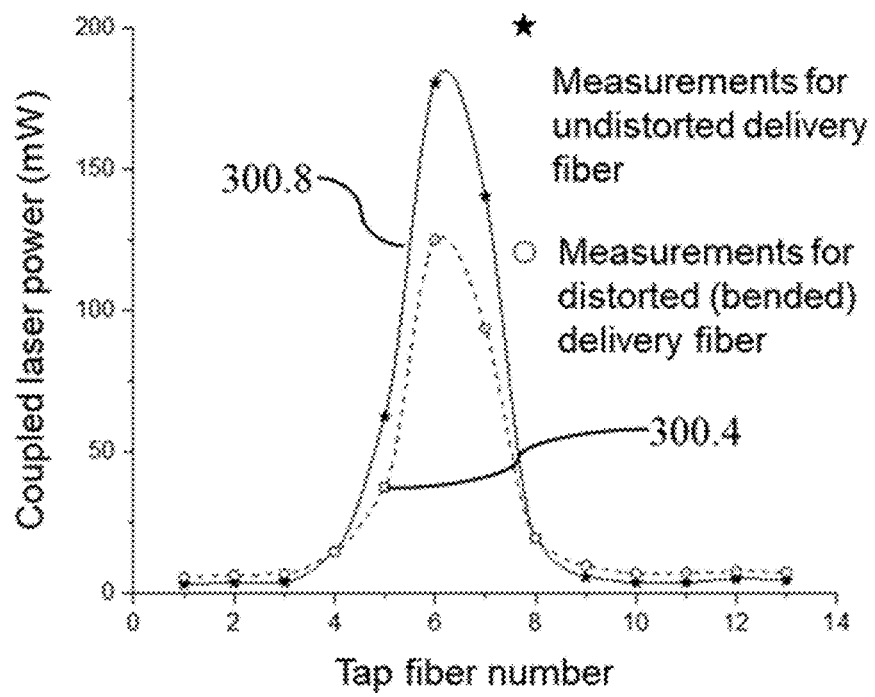
FIG. 9C shows a graph of exemplary calibration data of the CIMT device of FIG. 7 utilized for sensing contribution of cladding and residual light.

The ability to accurately forecast the light power received by each of 13 tap fibers in the CIMT sensing module is illustrated by the plots in FIG. 9A, which compares the calibration measurements of the laser power received by each tap fiber (300.2) with the corresponding numerical simulation data (300.3). The calibration and simulation data were obtained for the exemplary CIMT sensing module (300) in FIG. 8A-8C by fiber-splicing the delivery fiber of the CIMT module (300) to a high power fiber amplifier system with laser power ranging from 50 to 1200 W. For more clarity, the distribution of the laser power received by the thirteen tap fibers is presented in FIG. 9B in the form of a polar plot that is superimposed with a side elevation view of the tap fibers in FIG. 8A. As FIGS. 9A and 9B indicate, the largest value of received laser power corresponded to the tap fiber #6. The fiber core of this tap fiber was located near the center of back reflected main beam footprint region (200.12), as shown in FIG. 7. Note, that non-zero values of laser power received by tap fibers located at the opposite side from the tap fiber #6 (e.g., tap fibers #1-3 and #10-13 in FIG. 9B) indicate presence of cladding light coming from the delivery fiber tip. These tap fibers, located inside the cladding light footprint (200.13), provide sensing of both cladding and residual pump light. As an illustration FIG. 9B compares the calibration data (300.3) of the laser power received by the tap fibers with the corresponding data (300.4) obtained with intentional bending of the delivery fiber in order to enhance cladding light contribution in the transmitted laser power. The bending of the delivery fiber resulted in both decrease of the main light power received by the tap fiber #6 and increase in light power received by the tap fibers located inside the cladding light footprint (200.13). The calibration data characterizing laser power received by the set of 13 tap fibers (200.2) without (300.8) and with (300.4) delivery fiber bending is presented in FIG. 9C. The cladding light power level could be evaluated by measuring redistribution of the coupling light between the tap fiber in respect to the calibration curve. Since wavelength of the residual pump light is different from the main beam and cladding light wavelength, the residual pump light may be easily separated from the cladding light using conventional techniques (e.g., such as those based on a dichroic beam splitter or narrow band filter).

Figure 9D:
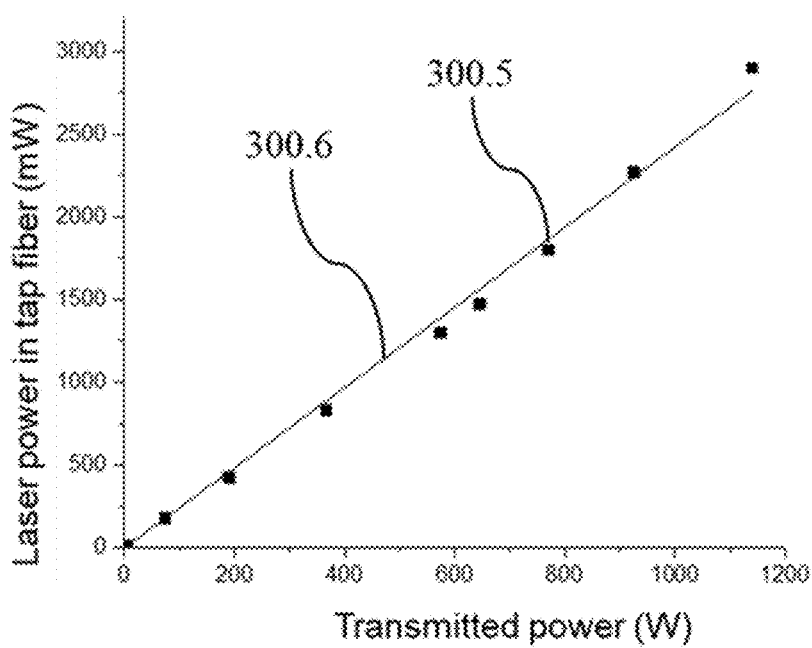
FIG. 9D shows a graph of exemplary calibration data of the CIMT device of FIG. 7 utilized for sensing of the transmitted laser power.

The ability for the CIMT sensing module (300) to monitor power of the transmitted laser beam and, thus, be used as an optical power sensor is illustrated using an exemplary dataset in FIG. 9D by the calibration data (300.5) and the fitting line (300.6) of the laser power that was received by the tap fiber #6 of the exemplary CIMT sensing module in FIG. 8A-8C. The measurements were performed with gradual increase of the transmitted through the fiber endcap (200.5) laser power up to 1.2 kW, though it should be understood that other operational characteristics are possible and will be apparent to those of ordinary skill in the art in light of the disclosure herein.

Figure 10:
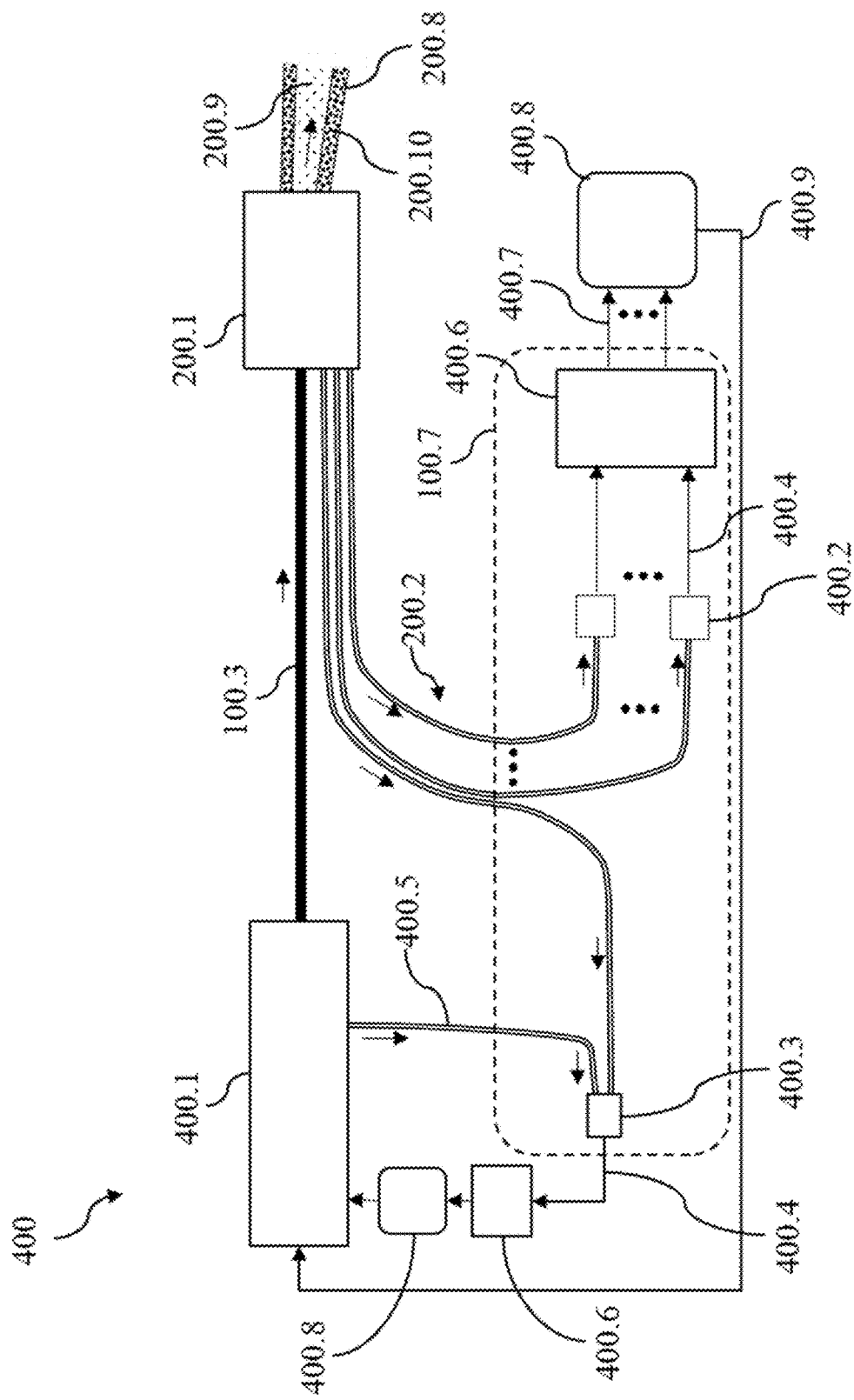
FIG. 10 is a general schematic of a fiber-tip-coupler sensing and control (FTC-SC) system architecture.

Methods for Laser Beam Characteristics Sensing and Control with Fiber Tip Couplers The sensing module (100.7) in FIG. 3 may be configured in various ways dependent on requirements for laser beam characteristic sensing and control, and the FTC fiber assembly implementation may be based on a single-tap or multi-tap fibers and utilize either identical or different type of tap fibers. The sensing module (100.7) may be composed of a single or many different sensing nodes. A notional schematic in FIG. 10 illustrates possible basic architecture of the FTC sensing and control (FTC-SC) system (400) that includes the sensing module (100.7) comprised by several sensing nodes. The FTC-SC system (400) includes a fiber-optics subsystem (400.1) that may have a single (100.3) or many delivery fibers that are connected (e.g. using fiber splicing) to the FTC assembly (200.1) with a single or many tap fibers (200.2). These tap fibers deliver a portion of the transmitted light (200.8) to the sensing nodes (400.2) and (400.3). As has been described, received light may include the main beam (200.9) and the cladding light (200.10), and may include the residual pump light component.

For sensing of laser power of the main beam (200.9) or cladding light (200.10), the sensing nodes (400.2) may utilize photo-detectors that transform the delivered through the tap fibers light to electrical signals (400.4).

For polarization sensing, the corresponding sensing nodes (400.2) may additionally include polarization sensitive elements (e.g. polarizers and polarization beam splitters) that select light components with a desired polarization state. These light components are further transformed in the sensing nodes to the electrical signals (400.4).

For residual pump light sensing, the corresponding sensing nodes (400.2) may additionally include optical filters that select light components with wavelength of the pump light prior to being converted to electrical signals (400.4).

For sensing of the differential piston phase of the main beam (200.9), the corresponding sensing node (400.3) has additional optical input that provides a reference optical wave that is coherent in respect to the main beam that is received through the tap fibers (200.2). Note that for the differential phase sensing the tap fiber should be SM fiber. In FIG. 10 the optical reference is shown as being delivered to the sensing node (400.3) from fiber-optics subsystem (400.1) through a SM PM fiber (400.5). The sensing node (400.3) may also include a fiber coupler that combines both optical inputs, and a polarizer in front of the photo-detector.

The electrical signals (400.4) from sensing nodes (400.2) and or (400.3) may be either directly used for in-situ monitoring of the characteristics of the transmitted through the delivery fiber beam (200.8), or be sent to the signal processing unit (400.6) for the retrieval of the desired characteristics from the sensing data (e.g. retrieval of the polarization state characteristics, content of different modes in the main beam and cladding light, evaluation of the residual pump light and coherence length).

Feedback Control of Laser Beam Polarization with Fiber Tip Coupler

The output signals (400.4) of the sensing nodes (400.2), the processed signals (400.7), or both may be used for programmable or feedback control of the transmitted beam characteristics, including but not limited by power, polarization, and piston phase. These signals may be used by the controller (400.8) to generate the control signals (400.9) applied to the corresponding control modules of the fiber-optics subsystem (400.1) (e.g. laser power controllers, polarization adjusters, phase shifters, optical path adjusters).

Figure 11:
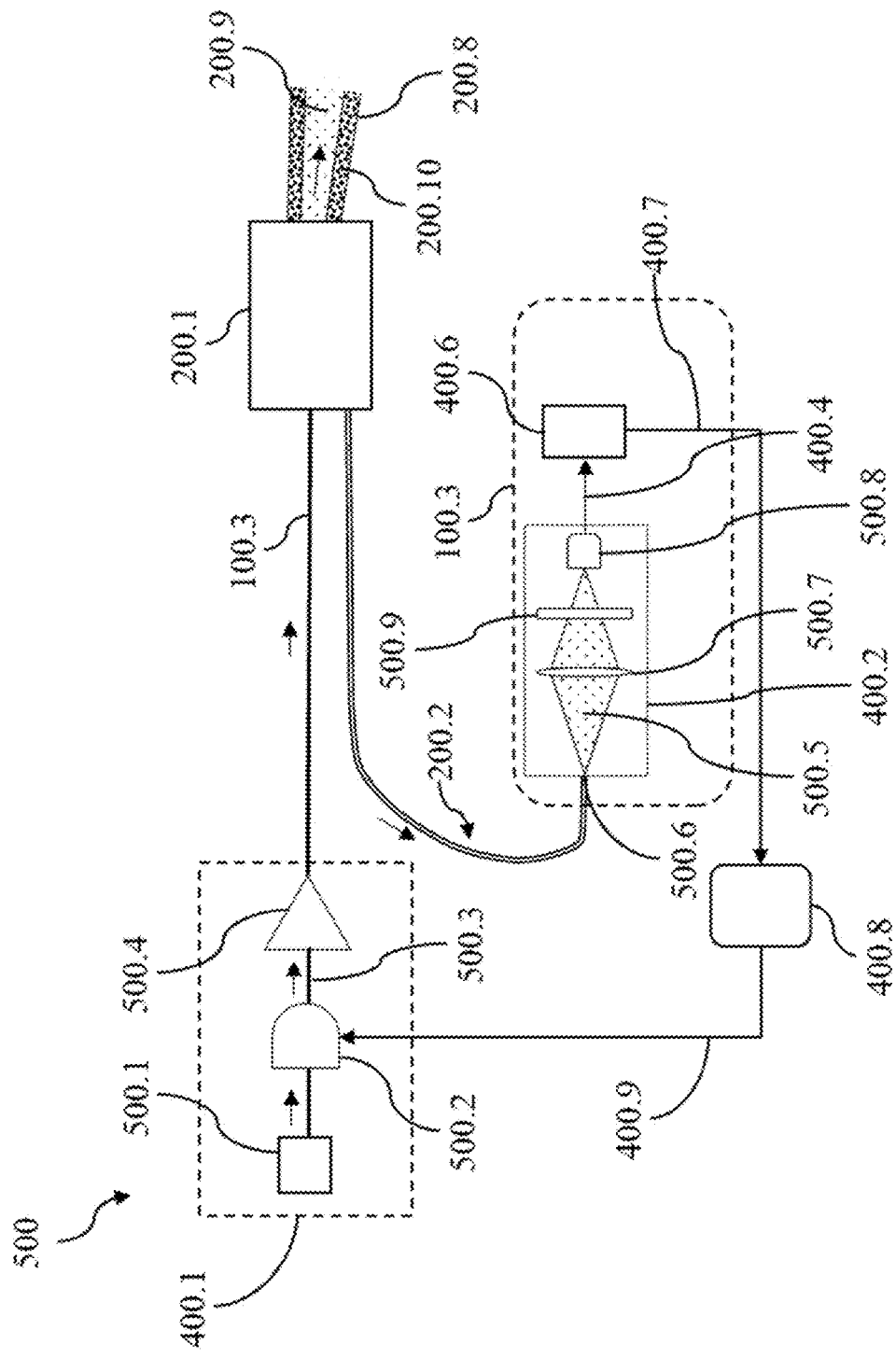
FIG. 11 is a notional schematic of an exemplary FTC-SC system for real-time control and stabilization (locking) of the transmitted main beam polarization state in a fiber-optics system.

A schematic of an exemplary FTC sensing and feedback control system for real-time stabilization, also referred to as locking, of the transmitted main beam polarization state is illustrated in FIG. 11. The polarization locking system (500) in FIG. 11 includes the fiber optics subsystem (400.1) based on SM non-PM fibers and fiber elements. The examples of such fiber optics subsystems include, for example, the high power single mode fiber amplifiers and various coherent fiber array laser systems used in directed energy, laser communications, power beaming, polarization imaging and laser additive manufacturing applications.

The polarization locking system (500) may be used to control and lock polarization of the transmitted main beam by a fiber-optics system at a specified polarization state. This polarization locking may be useful, for instance, to obtain an array of identically polarized laser beams in coherent fiber array laser systems based on non-PM fiber amplifiers. Without polarization locking these beams cannot efficiently be phased to achieve maximum laser power density at a remotely located target and or material, a desired goal in many military directed energy applications, as well as other applications. Both polarization locking and phasing of an array of laser beams may also be advantageous or required in applications for laser power beaming and free space laser communications, for example, to allow for adaptive optics mitigation of atmospheric turbulence effects.

In an exemplary fiber-optics subsystem (400.1) in FIG. 11, the laser light from a fiber-coupled laser source (500.1) propagates through a controllable polarization adjuster (500.2) that could be based, for example, on such commercial product as PolaStayPOS-002 from General Photonics Inc., or other fiber-optics devices with similar functionalities. The polarization adjuster (500.2) changes the polarization state of the laser beam in the output fiber (500.3) in response to the applied control signals (400.9). The laser beam transmitted through the polarization adjuster may be further amplified by the fiber amplifier (500.4). The delivery fiber (100.3) of the fiber amplifier routes the laser beam to the fiber tip (100.2) located inside the FTC assembly (200.1).

The FTC assembly (200.1) of the polarization locking system (500) in FIG. 11 utilizes a single or several SM PM tap fibers (200.2) that preserve the polarization state of the light received by these tap fibers. For more clarity, only a single tap fiber is depicted in FIG. 11. The fiber tip of the tap fiber in the FTC assembly (200.1) is located inside the footprint (200.12) of the back reflected main beam, as illustrated in FIG. 4 by the SM PM tap fibers (200.2A) and (200.2B). A portion of the main beam is delivered by the tap fiber (200.2) to the sensing node (400.2) of the sensing module (100.7), as shown in FIG. 11. In the sensing node (400.2), the laser light (500.5) is transmitted through the tip (500.6) of the tap fiber (200.2). The lens (500.7) focuses the transmitted beam (500.5) at the photo-detector (500.8). A polarization sensitive element (500.9) (e.g. a polarizer or polarization beam splitter) selects a specified polarization component of the main beam. The optical power of this light polarization component is registered by the photo-detector (500.8) and after electronic signal processing in the processing unit (400.6), which may include signal amplification, noise filtering, and other processing, is sent to the polarization controller unit (400.8) that computes the control signals (400.9) applied to the polarization adjuster (500.2). Note that the polarization sensing node (400.2) in FIG. 11 could be configured differently, and may, for example, be based on polarization sensitive elements integrated into the tap fiber, or may use a combination of fiber-integrated and free space optical elements.

For the polarization state locking, the polarization controller unit (400.8) may utilize one or another known control algorithms including but not limited to optimization algorithms such as gradient descent and or stochastic parallel gradient descent (SPGD) iterative algorithms that provide polarization state locking via optimization (e.g. maximization) of the signal (400.4) registered by the photo-detector (500.8) or the corresponding electronically processed signal (400.7).

Figure 12A:
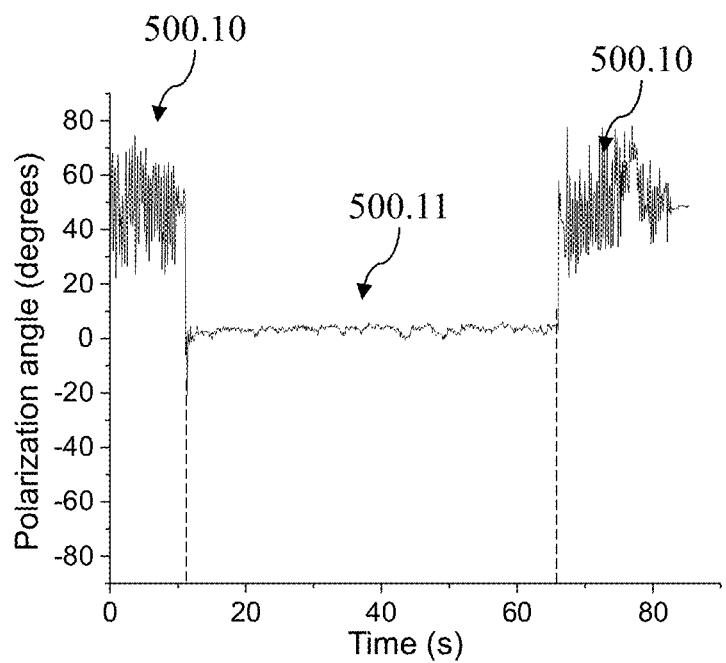
FIG. 12A is a graph of exemplary experimental data illustrating ability of the FTC-SC system of FIG. 11 for real-time stabilization of the transmitted main beam polarization angle in a fiber-optics system based on SM non-PM fibers and fiber-elements.
Figure 12B:
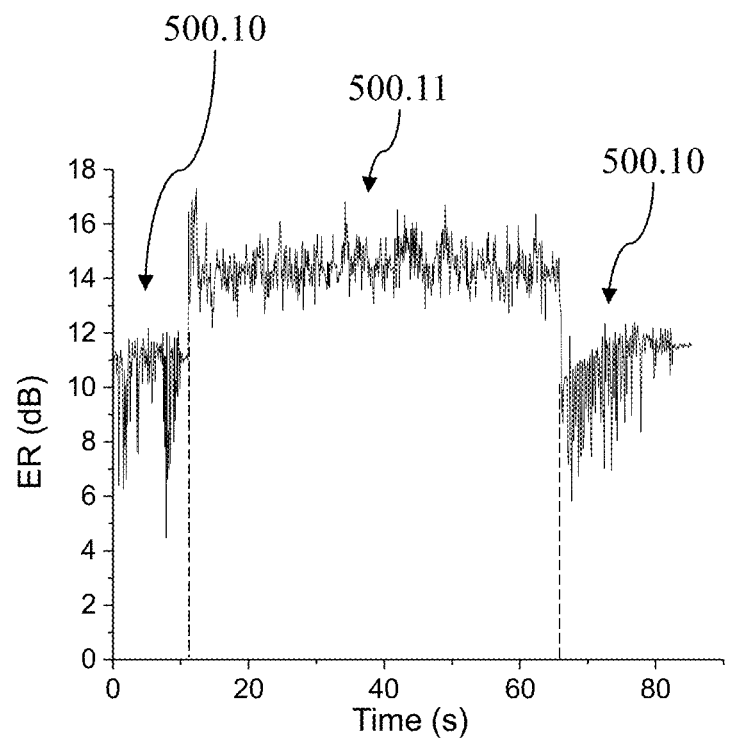
FIG. 12B is a graph of exemplary experimental data illustrating the ability of the FTC-SC system of FIG. 11 for real-time polarization extension ratio increase of the transmitted main beam in a fiber-optics system based on SM non-PM fibers and fiber-elements.

To illustrate, the plots in FIG. 12A and FIG. 12B show experimental data obtained using a polarization locking method such as that described above. The fiber-optics system (400.1), operated at 1064 nm wavelength, included a commercially available seed laser, polarization adjuster, and fiber amplifier with 1.0 kW output power level. The 400 μm diameter delivery fiber (100.3) was assembled inside the exemplary CIMT sensing module shown in FIG. 8 and FIG. 9B. The SM PM tap fiber #6, as shown in FIG. 9B, was used as a tap fiber for polarization locking. In the sensing node of the experimental setup, a conventional polarizer was used to select a linearly polarized component of the main laser beam. The corresponding electrical signal (400.4) was used as the polarization locking system performance metric that was maximized using the SPGD controller. Both the output laser beam (200.8) polarization angle temporal deviation, shown in FIG. 12A, and the polarization extension (ER) ratio, shown in FIG. 12B, which are indicative of quality of polarization locking into a liner polarization state, were measured using commercially available polarization analyzing equipment.

The time evolution plots in FIG. 12 show dynamics of both the polarization angle deviation from the zero angle that was set by the polarizer, and the polarization extension (ER) ratio, for periods of time when the feedback control system was OFF (500.10) and periods of time when the control system was ON (500.11). The achieved level of the polarization angle deviation not exceeding +/−1.25 deg. and high level of the polarization extension ratio ~14.45 dB+/− 0.75 dB clearly demonstrate the effect of the polarization control method and system disclosed herein.

Polarization Locking of Multiple Beams in Fiber Array Laser Systems

Locking of polarization states of multiple laser beams may be advantageous for applications in emerging fiber array laser transmitter and high energy laser (HEL) beam director technologies, including directed energy, power beaming, active imaging and remote sensing. In these fiber array systems, multiple laser beams are originated in either a single master oscillator power amplifier (MOPA) fiber-optics subsystem, or in multiple fiber-optics subsystems. In both cases, these multi-channel fiber-optics subsystems may be based on non-PM fibers which makes them more efficient, less expensive and able to operate with higher laser power without being affected by undesired nonlinear effects in fibers. A disadvantage of the non-PM fiber-based fiber array technology is that polarization states of individual laser beams in these multi-channel fiber-optics systems are randomly varying. This prevents utilization of these systems in the applications that require identical or near identical polarization states to perform such functions as (a) adaptive optics compensation of atmospheric turbulence effects in directed energy and active imaging systems, (b) adaptive shaping of laser beam intensity in power beaming and laser additive manufacturing systems, and (c) controllable change of the polarization states in the polarimetric imaging systems.

Figure 13:
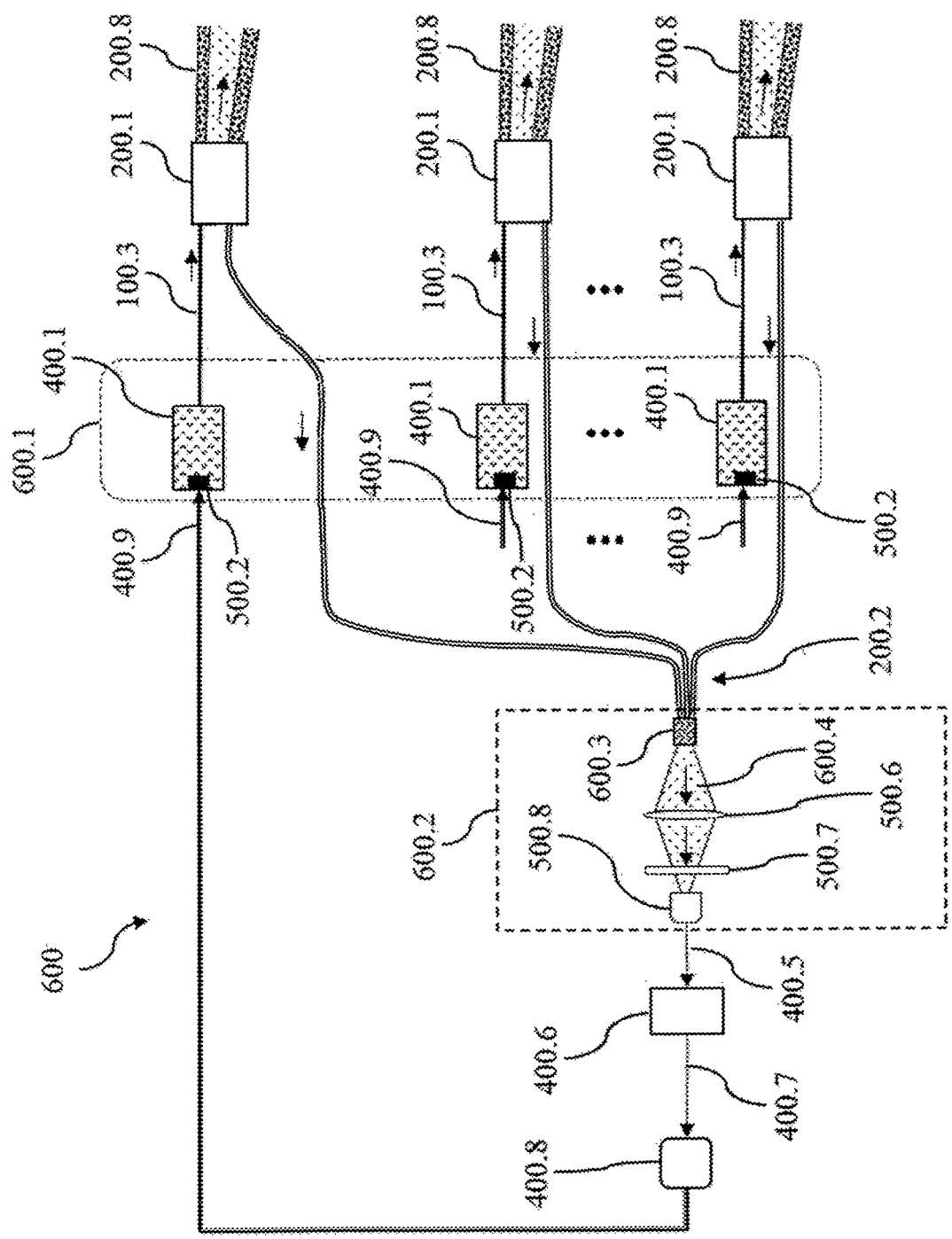
FIG. 13 is a notional schematic illustrating a method and control system architecture for polarization locking and control of multiple laser beams in fiber array laser systems using the fiber-tip-coupler sensing modules.

The schematic in FIG. 13 illustrates a control system architecture usable to provide polarization locking and control of multiple laser beams in fiber array laser systems without insertion of external optical elements and sensors to the transmitted laser light. In the multi-beam polarization locking and control system (600) in FIG. 13, multiple laser beams (200.8) are generated in a fiber-optics subsystem (600.1) that may be composed of multiple fiber-optics laser modules (400.1), or may be configured as a single multi-channel MOPA fiber-optics system. The generated laser beams are routed to the tips of the delivery fibers (100.3) that are assembled inside the FTC assemblies (200.1). The polarization locking and control system (600) utilizes a single or several SM PM tap fibers (200.2). For more clarity, only a single tap fiber per fiber channel is depicted in FIG. 13. The fiber tips of the tap fibers in the FTC assemblies (200.1) are located inside footprints of the back reflected main beams, as illustrated in FIG. 4 by the SM PM tap fibers (200.2A) and (200.2B). A portion of each main beam is delivered by each tap fiber (200.2) to the sensing node (600.2), as shown in FIG. 13. The tap fibers in the sensing node (600.2) are combined into bundle (600.3) with densely packed fiber tips. The laser light (600.4) that is transmitted through the tap fiber bundle (600.3) is focused by the lens (500.6) to the photo-detector (500.8). A polarization sensitive element (500.7) (e.g. a polarizer, polarization beam splitter) selects a specified polarization component of the array of main beams. The optical power of this light polarization component is registered by the photo-detector (500.8), and after electronic signal processing in the processing unit (400.6), which may include signal amplification, noise filtering, or other processing, is sent to the polarization controller unit (400.8). The polarization controller unit (400.8) is configured to compute the control signals (400.9) applied to the polarization adjusters (500.2) of the fiber-optics subsystems (400.1), or to the polarization adjusters that are integrated into each fiber channel of the MOPA fiber-optics subsystem. Note that the polarization sensing node (600.2) in FIG. 13 could be configured differently, and could, for example, be based on tap fiber integrated polarization sensitive elements, or a combination of fiber-integrated and free space optical elements.

For polarization state locking, the polarization controller unit (400.8) may utilize one or another known control algorithm, such as the SPGD iterative algorithms, that provide polarization state locking via optimization of the signal (400.4) registered by the photo-detector (500.8) or the corresponding electronically processed signal (400.7).

For polarimetric imaging with controllable change of polarization states for all laser beams, the polarization sensitive element (500.7) in FIG. 13 may provide capabilities for controllable alternation of the light polarization component. This change of the selected polarization component may be performed at a slow time rate compared with the polarization locking process. The controllable polarization alternation may be needed to enhance resolution of polarimetric imaging systems used for active imaging using the laser light scattered off the target.

Phase Locking of Multiple Beams in Fiber Array Laser Systems

Locking of mutual phases, also referred to as differential or piston phases, of multiple laser beams may be advantageous or required in fiber array systems used for directed energy, power beaming, active imaging and remote sensing applications. In such fiber array systems, the transmitted laser beams originate from a multi-channel MOPA fiber-optics subsystem. To decrease divergence of the transmitted laser energy, and achieve an increase in laser power density at a remotely located target that is illuminated by the fiber array laser transmitter, or to adaptively shape a laser beam on the remote located target, the array of fibers may need to be configured to produce stable (e.g., locked) piston phases for the transmitted beams. Note that phase locking may advantageously achieved in a multi-channel MOPA-based fiber array system, referred to as narrow-line or coherent MOPA-based fiber array system, that generates laser beams with nearly identical polarization states and optical frequencies.

Figure 14:
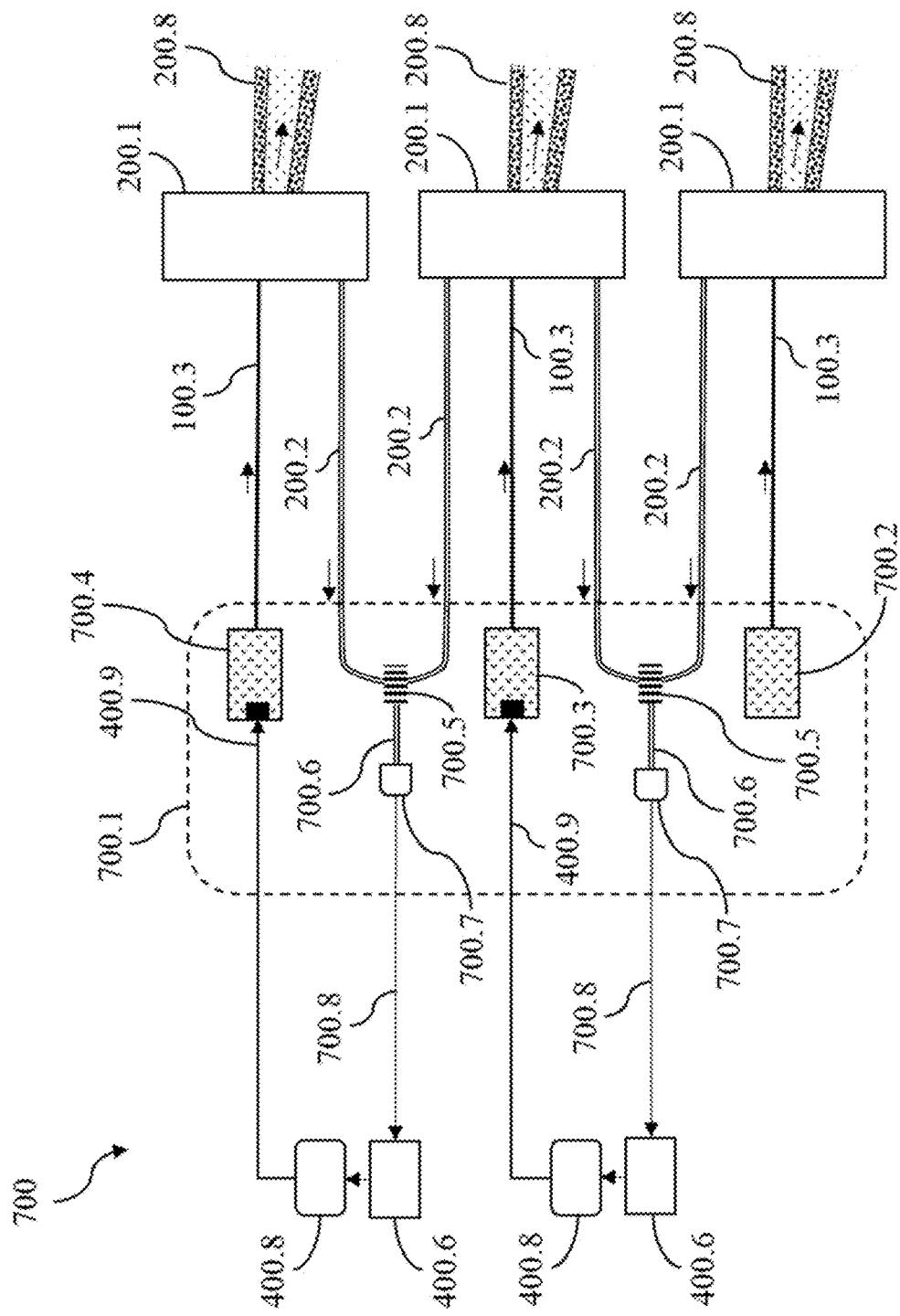
FIG. 14 is a notional schematic illustrating a method and control system architecture for locking and control of piston phases of multiple laser beams in coherent fiber array laser systems using the fiber-tip-coupler sensing modules.

The schematic in FIG. 14 illustrates a control system architecture (700), that may provide locking and control of piston phases of multiple laser beams in coherent fiber array laser systems without insertion of external optical elements and sensors to the transmitted laser light. The multiple laser beams (200.8) are generated in a multi-channel MOPA fiber-optics subsystem (700.1). For simplicity and better clarity, in FIG. 14 a coherent MOPA system with only three channels (700.2, 700.3, 700.4) is shown. A piston phase of one of channels in the MOPA system is identified as a reference phase. The feedback phase locking control system is designed to force all piston phases of the transmitted beams to be either equal the reference phase, or different by a value $2n\pi$ radiant (n=1, 2, ... ), independent on temporal variation of the reference piston phase. For the purpose of illustration only, the fiber channel (700.2) in FIG. 14 is considered as a reference phase and the piston phases of two other channels are locked in respect to the piston phase of the reference channel. The number of fiber channels similar to (700.3) and (700.4) could be one or many.

The laser beams that are generated in the coherent MOPA system (700.1) in the fiber channels are routed by the delivery fibers (100.3) to the corresponding fiber tips. The end sections of the delivery fibers (100.3) are held inside the FTC assemblies (200.1) with a single or several SM PM tap fibers (200.2). The FTC assembly of the reference fiber channel (700.2) may have only a single tap fiber, while FTC assemblies of the other fiber channels may have either a single tap fiber or several tap fibers. For more clarity, in FIG. 14 the FTC assembly of the reference fiber channel (700.2) and the fiber channel (700.4) have a single tap fiber, while the FTC assembly (700.3) has two tap fibers.

The fiber tips of the tap fibers in the FTC assemblies (200.1) are located inside footprints of the back reflected main beams, as illustrated in FIG. 4 by the SM PM tap fibers (200.2A) and (200.2B). A portion of each main beam is delivered by each tap fiber (200.2) to the tap fiber combiners (700.5). The fiber combiners merge laser beams propagating in two tap fiber coming from different FTC assemblies into the output fibers (700.6), resulting in their interference. The output fibers (700.6) are fiber-connected to the corresponding photo-detectors (700.7) as illustrated in FIG. 14. Interference of two laser beams coming from the tap fibers belonging to different FTC assemblies results in modulation of the photo-detector output signals (700.8), which depends on mismatch in piston phases of the transmitted beams (200.8) of the corresponding fiber-optics channels. Note that specific architecture of tap fibers interconnection with fiber combiners that merge two laser beams belong to different FTC assemblies may be different. The tap fiber combination in FIG. 14 serves as an illustration only. Other tap fiber interconnection architectures that provide sensing of mutual piston phases via interference of various combinations of two beams originating in different FTC assemblies are also possible. Note that for sensing of the two-beam interference-induced modulation of the registered by photo-detectors signals (700.8), the sensing fiber elements including tap fibers (200.2) and fiber combiners (700.5) with output fibers (700.6) should preserve polarization states of the laser light received by the tap fibers (200.2). A polarization sensitive element (e.g. a polarizer and or polarization beam splitter) may be also used to select a specified polarization component of the transmitted beams (200.8).

In the phase locking control system (700) in FIG. 14, the signals (700.8) from the photo-detectors (700.7) are routed to the electronic signal processing units (700.9) that may provide signal amplification, filtering of noise or DC component of the registered signals, or other processing. The processed signals (700.10) are sent to the piston phase controller units (700.11) that compute control signals (700.12) applied to controllable phase shifters (700.13) integrated into fiber channels (700.4) of the MOPA system. These phase shifting elements may be based, for example, on the commercially fiber-integrated LiNbO$_3$ phase shifters or similar devices. Note that the two-beam interference sensing in FIG. 14 could be configured differently, for using one or another free-space interferometric devices or using combination of fiber-integrated and free space optical elements to produce two-beam interference.

For the piston phase locking, the controllers (700.11) may utilize a control algorithm including such as the SPGD iterative algorithms, or another algorithm that provides phase locking via optimization of the signal (700.8) registered by the photo-detector (700.7) or the corresponding electronically processed signal (700.10).

The invention claimed is:

1. A method comprising:
  (a) operating a laser light source to transmit laser light via one or more delivery fibers to a fiber tip coupler sensing and control system (FTC-SC);
  (b) at an endcap interface surface of the FTC-SC, transmitting a transmitted portion of the laser light towards a target in a first direction;
  (c) at the endcap interface surface, reflecting a reflected portion of the laser light in a second direction towards one or more tap fibers;
  (d) with a sensing module, receiving the reflected portion from the one or more tap fibers;
  (e) determining at least one characteristic of the transmitted portion based upon the reflected portion; and
  (f) providing a set of control signals to a laser light source controller based upon a desired value for the at least one characteristic of the transmitted portion and the determined at least one characteristic of the transmitted portion;
  wherein the set of control signals are configured to cause the laser light source controller to modify laser light so that a subsequent determined at least one characteristics of the transmitted portion substantially matches the desired value; and
  wherein the sensing module comprises: (i) a first sensing node configured to receive the reflected portion; and (ii) a second sensing node configured to receive a reference optical wave from the laser light source; the method further comprising determining, by the sensing module, the at least one characteristic of the transmitted portion based upon the reflected portion and the reference optical wave.

2. A method comprising:
  (a) operating a laser light source to transmit laser light via one or more delivery fibers to a fiber tip coupler sensing and control system (FTC-SC);
  (b) at an endcap interface surface of the FTC-SC, transmitting a transmitted portion of the laser light towards a target in a first direction;
  (c) at the endcap interface surface, reflecting a reflected portion of the laser light in a second direction towards one or more tap fibers;
  (d) with a sensing module, receiving the reflected portion from the one or more tap fibers;
  (e) determining at least one characteristic of the transmitted portion based upon the reflected portion; and
  (f) providing a set of control signals to a laser light source controller based upon a desired value for the at least one characteristic of the transmitted portion and the determined at least one characteristic of the transmitted portion;
  wherein the set of control signals are configured to cause the laser light source controller to modify laser light so that a subsequent determined at least one characteristics of the transmitted portion substantially matches the desired value; and
  wherein the sensing module comprises: (i) a lens configured to receive the reflected portion; (ii) a polarizer element configured to receive the reflected portion from the lens and polarize the reflected portion to select a specific polarization component; and (iii) a photo detector configured to receive the reflected portion from the polarizer element and measure characteristics of the reflected portion; the method further comprising applying, by a polarization controller, a control algorithm to the set of control signals to provide polarization state locking for the laser light source.

3. A method comprising:
  (a) operating a laser light source to transmit laser light via one or more delivery fibers to a fiber tip coupler sensing and control system (FTC-SC);
  (b) at an endcap interface surface of the FTC-SC, transmitting a transmitted portion of the laser light towards a target in a first direction;
  (c) at the endcap interface surface, reflecting a reflected portion of the laser light in a second direction towards one or more tap fibers;
  (d) with a sensing module, receiving the reflected portion from the one or more tap fibers;
  (e) determining at least one characteristic of the transmitted portion based upon the reflected portion; and
  (f) providing a set of control signals to a laser light source controller based upon a desired value for the at least one characteristic of the transmitted portion and the determined at least one characteristic of the transmitted portion;
  wherein the set of control signals are configured to cause the laser light source controller to modify laser light so that a subsequent determined at least one characteristics of the transmitted portion substantially matches the desired value; and
  wherein the method further comprises: (a) transmitting laser light from a set of laser modules of the laser light source via a plurality of delivery fibers to a plurality of fiber tip coupler sensing and control systems (FTC-SCs); (b) with each of the plurality of FTC-SCs, providing reflected light to the sensing module; and (c) with a fiber bundler of the sensing module, receiving and combining reflected light from the plurality of FTC-SCs prior to determining the at least one characteristic of the transmitted portion for each of the plurality of FTC-SCs.

4. A method comprising:
(a) operating a laser light source to transmit laser light via one or more delivery fibers to a fiber tip coupler sensing and control system (FTC-SC);
(b) at an endcap interface surface of the FTC-SC, transmitting a transmitted portion of the laser light towards a target in a first direction;
(c) at the endcap interface surface, reflecting a reflected portion of the laser light in a second direction towards one or more tap fibers;
(d) with a sensing module, receiving the reflected portion from the one or more tap fibers;
(e) determining at least one characteristic of the transmitted portion based upon the reflected portion; and
(f) providing a set of control signals to a laser light source controller based upon a desired value for the at least one characteristic of the transmitted portion and the determined at least one characteristic of the transmitted portion;
wherein the set of control signals are configured to cause the laser light source controller to modify laser light so that a subsequent determined at least one characteristics of the transmitted portion substantially matches the desired value; and
wherein the method further comprises transmitting the transmitted portion of the laser light in the first direction through free space for a transmission distance, wherein the transmission distance is equal to the distance between the endcap interface and the target.

5. The method of claim 4, further comprising configuring the endcap interface surface with an angle based on the position of the one or more delivery fibers relative to the one or more tap fibers.

6. The method of claim 4, further comprising configuring the FTC-SC so that the one or more delivery fibers, the endcap interface surface, and the one or more tap fibers have a permanently fixed position and orientation relative to each other.

7. A method comprising:
(a) operating a laser light source to transmit laser light via one or more delivery fibers to a fiber tip coupler sensing and control system (FTC-SC);
(b) at an endcap interface surface of the FTC-SC, transmitting a transmitted portion of the laser light towards a target in a first direction;
(c) at the endcap interface surface, reflecting a reflected portion of the laser light in a second direction towards one or more tap fibers;
(d) with a sensing module, receiving the reflected portion from the one or more tap fibers;
(e) determining at least one characteristic of the transmitted portion based upon the reflected portion; and
(f) providing a set of control signals to a laser light source controller based upon a desired value for the at least one characteristic of the transmitted portion and the determined at least one characteristic of the transmitted portion;
wherein the set of control signals are configured to cause the laser light source controller to modify laser light so that a subsequent determined at least one characteristics of the transmitted portion substantially matches the desired value; and
wherein the method further comprises: (a) transmitting laser light from the one or more delivery fibers to the endcap interface surface without transmitting the laser light through free space; and (b) transmitting laser light from the endcap interface surface to the one or more tap fibers without transmitting the laser light through free space.

8. A fiber tip coupler for a sensing and control system comprising:
(a) an endcap including a light transmitting material and an interface surface;
(b) a laser delivery fiber including a fiber tip and an input tip, wherein the fiber tip is coupled to the endcap at a first position and the input tip is configured to couple with a laser light source;
(c) a tap fiber including a tap fiber tip and an output tip, wherein the tap fiber tip is coupled to the endcap at a second position and the output tip is configured to couple with a laser sensing system;
wherein the interface surface is configured to have an angle based on the first position and the second position, and wherein the angle is selected to cause laser light from the fiber tip to be separated into: (i) a transmitted portion that enters free space via the interface surface, and (ii) a reflected portion that reflects off the interface surface and strikes the tap fiber tip; and
wherein the fiber tip coupler further comprises a shell, wherein: (i) the shell includes a plurality of capillaries, (ii) the laser delivery fiber and the tap fiber tip are each at least partially fused within capillaries of the plurality of capillaries so that the fiber tip and the tap fiber tip are at a surface of the shell, and (iii) the shell is coupled to the endcap.

9. The fiber tip coupler of claim 8, wherein the first position, the second position, and the angle of the interface surface are selected based upon a ray tracing simulation or a wave-optics method.

10. A fiber tip coupler for a sensing and control system comprising:
(a) an endcap including a light transmitting material and an interface surface;
(b) a laser delivery fiber including a fiber tip and an input tip, wherein the fiber tip is coupled to the endcap at a first position and the input tip is configured to couple with a laser light source;
(c) a tap fiber including a tap fiber tip and an output tip, wherein the tap fiber tip is coupled to the endcap at a second position and the output tip is configured to couple with a laser sensing system;
wherein the interface surface is configured to have an angle based on the first position and the second position, and wherein the angle is selected to cause laser light from the fiber tip to be separated into: (i) a transmitted portion that enters free space via the interface surface, and (ii) a reflected portion that reflects off the interface surface and strikes the tap fiber tip; and
wherein the tap fiber tip is fused to the endcap at a non-orthogonal tap angle, wherein the non-orthogonal tap angle is selected based on the angle of the interface surface, the first position, and the second position.

11. The fiber tip coupler of claim 10, wherein the light transmitting material comprises a glass material.

12. A fiber tip coupler for a sensing and control system comprising:
(a) an endcap including a light transmitting material and an interface surface;

(b) a laser delivery fiber including a fiber tip and an input tip, wherein the fiber tip is coupled to the endcap at a first position and the input tip is configured to couple with a laser light source;
(c) a tap fiber including a tap fiber tip and an output tip, wherein the tap fiber tip is coupled to the endcap at a second position and the output tip is configured to couple with a laser sensing system;
wherein the interface surface is configured to have an angle based on the first position and the second position, and wherein the angle is selected to cause laser light from the fiber tip to be separated into: (i) a transmitted portion that enters free space via the interface surface, and (ii) a reflected portion that reflects off the interface surface and strikes the tap fiber tip; and
wherein the tap fiber is configured as a single mode polarization maintaining tap fiber, the fiber tip coupler further comprising: (a) a single mode non-polarization maintaining tap fiber fused to the endcap at a third position; (b) a large mode area tap fiber fused to the endcap at a fourth position; and (c) a multi-mode tap fiber fused to the endcap at a fifth position; wherein the second position, third position, fourth position, and fifth position are each within a beam footprint of the reflected portion.

13. A fiber tip coupler for a sensing and control system comprising:
(a) an endcap including a light transmitting material and an interface surface;
(b) a laser delivery fiber including a fiber tip and an input tip, wherein the fiber tip is coupled to the endcap at a first position and the input tip is configured to couple with a laser light source;
(c) a tap fiber including a tap fiber tip and an output tip, wherein the tap fiber tip is coupled to the endcap at a second position and the output tip is configured to couple with a laser sensing system;
wherein the interface surface is configured to have an angle based on the first position and the second position, and wherein the angle is selected to cause laser light from the fiber tip to be separated into: (i) a transmitted portion that enters free space via the interface surface, and (ii) a reflected portion that reflects off the interface surface and strikes the tap fiber tip; and
wherein: (a) the first position at which the fiber tip is fused to the endcap is substantially centrally positioned on a back surface of the endcap; (b) the second position at which the tap fiber tip is fused to the endcap, as well as a plurality of positions at which a plurality of tap fiber tips are fused to the endcap, including the second position, are arranged to surround the first position; and
(c) each of the plurality of positions is one of: (i) positioned entirely within a main beam footprint of the reflected portion; (ii) positioned partially within the main beam footprint and partially within a cladding light footprint of the reflected portion; (iii) positioned entirely within the cladding light footprint; (iv) positioned partially within the cladding light footprint and partially outside of the reflected portion; or (v) positioned entirely outside of the reflected portion.

14. A method comprising:
(a) operating a laser light source to transmit laser light to a fiber tip of a delivery fiber, wherein the fiber tip is coupled to an endcap at a first position of the endcap;
(b) receiving, by the end cap, the laser light, wherein the endcap includes a light transmitting material and an interface surface, and wherein the interface surface is configured to receive and separate laser light from the fiber tip into: (i) a transmitted portion that enters free space via the interface surface, and (ii) a reflected portion that reflects off the interface surface; and
(c) receiving the reflected portion with one or more tap fibers that are coupled to a second position of the endcap; and
wherein the method further comprises fusing the fiber tip to the endcap at the first position and fusing the one or more tap fibers to the endcap at the second position to provide a permanently fixed position and orientation relative to the interface surface.

15. The method of claim 7, further comprising (a) providing the reflected portion to a sensing module; (b) measuring at least one characteristic of the reflected portion using the sensing module; and (c) determining at least one characteristic of the transmitted portion based upon the at least one characteristic of the reflected portion.

16. The method of claim 15, further comprising: (a) generating a control signal based upon a desired value for the at least one characteristic of the transmitted portion and the determined at least one characteristic of the transmitted portion; and (b) providing the control signal to a laser light source controller; wherein the control signal is configured to cause the laser light source controller to modify the laser light produced by the laser light source so that a subsequent determined at least one characteristic of the transmitted portion substantially matches the desired value.

17. The method of claim 7, further comprising selecting an angle of the interface surface based upon the first position and the second position of the endcap.

\* \* \* \* \*